US012283873B2

(12) United States Patent
Corey, III et al.

(10) Patent No.: US 12,283,873 B2
(45) Date of Patent: Apr. 22, 2025

(54) METHOD AND SYSTEM FOR POLE RETAINER WITH INTEGRATED COOLING

(71) Applicant: DRS Naval Power Systems, Inc., Milwaukee, WI (US)

(72) Inventors: Calvin H. Corey, III, Scituate, MA (US); William R. Wink, Brookline, NH (US)

(73) Assignee: DRS Naval Power Systems, Inc., Milwaukee, WI (US)

( * ) Notice: Subject to any disclaimer, the term of this patent is extended or adjusted under 35 U.S.C. 154(b) by 416 days.

(21) Appl. No.: 17/742,276

(22) Filed: May 11, 2022

(65) Prior Publication Data

US 2022/0368198 A1   Nov. 17, 2022

Related U.S. Application Data

(60) Provisional application No. 63/188,043, filed on May 13, 2021.

(51) Int. Cl.
*H02K 1/18* (2006.01)
*H02K 1/20* (2006.01)
(Continued)

(52) U.S. Cl.
CPC .............. *H02K 9/225* (2021.01); *H02K 1/18* (2013.01); *H02K 1/20* (2013.01); *H02K 1/28* (2013.01); *H02K 1/32* (2013.01); *H02K 9/20* (2013.01)

(58) Field of Classification Search
CPC .......... H02K 1/14; H02K 1/146; H02K 1/148; H02K 1/18–1/187; H02K 1/20; H02K 1/32
See application file for complete search history.

(56) References Cited

U.S. PATENT DOCUMENTS

| 4,943,746 | A  | 7/1990  | Scherzinger et al. |
| 6,661,133 | B2 | 12/2003 | Liebermann |

(Continued)

FOREIGN PATENT DOCUMENTS

| CN | 112003402 A    |   | 11/2020 |            |
| EP | 2876783    A1  | * | 5/2015  | ... H02K 1/24 |

OTHER PUBLICATIONS

Application No. PCT/US2022/028841, International Search Report and Written Opinion, Mailed On Aug. 30, 2022, 8 pages.

(Continued)

*Primary Examiner* — Ramon M Barrera
(74) *Attorney, Agent, or Firm* — Kilpatrick Townsend

(57) ABSTRACT

The disclosed apparatus, system, and techniques described herein allow pole retention hardware of the electric motor to also function as a cooling manifold for removing heat generated by the electrical coils. A pole retainer apparatus can include a pole retainer for retaining a pole to a hub. The pole retainer can include a proximal end mounted on the hub and a distal end. The pole retainer can include a channel extending through the pole retainer from the proximal end of the pole retainer mounted on the hub to the distal end of the pole retainer. The apparatus can include a mount located at the distal end of the pole retainer and configured to retain the pole on the hub. The apparatus can include a fluid transfer duct connected to the mount. The cooling system can be employed on TORUS Axial Flux Permanent Magnet motors, and various other motor designs.

8 Claims, 19 Drawing Sheets

(51) Int. Cl.
  *H02K 1/28*    (2006.01)
  *H02K 1/32*    (2006.01)
  *H02K 9/20*    (2006.01)
  *H02K 9/22*    (2006.01)

(56) References Cited

U.S. PATENT DOCUMENTS

| | | |
|---|---|---|
| 7,112,901 B1 | 9/2006 | Soitu |
| 9,819,239 B2 * | 11/2017 | Pal .................. H02K 9/197 |
| 2010/0289386 A1 | 11/2010 | Gerstler et al. |
| 2013/0038151 A1 | 2/2013 | Ohashi et al. |
| 2015/0188391 A1 | 7/2015 | Carron et al. |
| 2016/0149450 A1 | 5/2016 | Horii et al. |
| 2017/0025927 A1 * | 1/2017 | Weerts ................ H02K 3/24 |
| 2017/0244301 A1 | 8/2017 | Isono et al. |
| 2020/0119609 A1 | 4/2020 | Foley et al. |

OTHER PUBLICATIONS

Application No. EP22808294.7, Extended European Search Report, Mailed On Jan. 17, 2025, 12 pages.

* cited by examiner

METHOD AND SYSTEM FOR POLE RETAINER WITH INTEGRATED COOLING

CROSS-REFERENCES TO RELATED APPLICATIONS

This application claims the benefit to U.S. Provisional Application No. 63/188,043, filed May 13, 2021 entitled "Method And System For Pole Retainer With Integrated Cooling," the disclosures which is incorporated by reference in its entirety and for all purposes.

BACKGROUND

Typically, electric machinery performance is limited by mechanical stress and thermal performance. Current Toroidal-Stator (TORUS) Axial Flux Permanent Magnet (AFPM) electrical motor cooling techniques can rely on air cooling or direct oil cooling. Direct oil cooling can include submerging the electric coils in oil or spraying the electric coil winding with oil when higher power densities are required. Rotating the electrical motor rotor assembly in oil will reduce the overall efficiency of the motor due to losses attributable to fluid density and dynamic viscosity of the oil interacting with stationary and rotating components, resulting in frictional and windage losses.

Toroidal-Stator AFPM motors are widely considered torque-dense or power-dense on a foot-pound per pound or newton meter per kilogram basis because of elimination of a back iron in the stator assembly, allowing the flux lines to go straight across the stator. However, cooling for TORUS AFPM motors can be challenging because the back iron is typically used for cooling or used as a heat transfer medium between the heat producing components in the stator and the cooling system. Therefore, there is a need in the art for improved methods and systems related to cooling of electric motors.

SUMMARY

The disclosed apparatus, system, and techniques described herein allow the pole retention hardware of the electric motor to function as a cooling manifold for removing heat generated by the electrical coils. The disclosed apparatus, system, and techniques can be particularly beneficial in the context of toroidal wound, axial-flux motors, allowing the coolant to be located adjacent to, or in close proximity to, the loss sources (e.g., coil conductors and pole laminations). Moreover, this technology can be implemented on wound field rotor poles, allowing for direct-pole cooling or permanent magnet rotor poles to remove rotor losses typical in high-speed permanent magnet machines.

In an aspect of the disclosure, a pole retainer apparatus can include a pole retainer for retaining a pole to a hub, wherein the pole retainer comprises a proximal end mounted on the hub and a distal end. The apparatus can include a channel extending through the pole retainer from the proximal end of the pole retainer to the distal end of the pole retainer. The apparatus can include a mount located at the distal end of the pole retainer and configured to retain the pole on the hub. The apparatus can include a fluid transfer duct connected to the mount.

In various embodiments, the fluid transfer duct connects to a condenser that includes one of more fins and a reservoir.

In various embodiments, the channel is configured to be connected to a manifold integrated in the hub.

In various embodiments, the channel is configured to contain a liquid coolant.

In various embodiments, the channel is configured to contain a heat pipe.

In various embodiments, the distal end of the pole retainer is threaded.

In various embodiments, the fluid transfer duct comprises a tube.

In various embodiments, the fluid transfer duct comprises a pipe.

In an aspect of the disclosure, a system for cooling an electric motor can include a stator pole configured to retain at least one of a coil or a magnet. The stator pole includes a recess. The system can include a pole retainer configured to fit inside the recess in the stator pole and to attach the stator pole to a hub, wherein the pole retainer can include a channel extending through the pole retainer shaft from a proximal end of the pole retainer shaft that is configured to be mounted on the hub to a distal end of the pole retainer. A proximal mount can be disposed at the proximal end of the pole retainer and configured to attach the pole retainer to the hub. The system can include a distal mount disposed at the distal end of the pole retainer and configured to connect the channel to a fluid transfer duct.

In various embodiments, the hub includes an integrated fluid manifold.

In various embodiments, the system includes a fluid seal disposed between the proximal mount and the hub.

In various embodiments, the fluid transfer duct connects to a condenser comprising one of more fins and a reservoir.

In various embodiments, the channel is configured be connected to a manifold integrated in the hub.

In various embodiments, the channel is configured to contain a liquid coolant.

In various embodiments, the channel is configured to contain a heat pipe.

In an aspect of the disclosure a method for cooling an electric motor includes routing a cooling fluid from a manifold in a hub through a first channel extending through a first pole retainer configured to attach a first pole to the hub. The method can include absorbing, by the cooling fluid, heat generated by one or more first coils one or more first permanent magnets attached to the first pole. The method can include routing, through a fluid transfer duct, the cooling fluid from the first channel to a second channel extending through a second shaft pole retainer configured to attach a second pole to the hub. The method can include absorbing, by the cooling fluid, heat generated by one or more second coils or one or more second permanent magnets attached to the second pole. The method can include routing the cooling fluid from the second channel to the manifold in the hub.

In various embodiments, the method includes routing the cooling fluid through a heat exchanger in the manifold in the hub.

In various embodiments, the method includes routing the cooling fluid through a heat exchanger disposed between the first channel and the second channel.

In various embodiments, the method include circulating the cooling fluid by rotating the hub.

In various embodiments, the method includes measuring a temperature of the cooling fluid via a temperature sensor in communication with the cooling fluid.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

BRIEF DESCRIPTION OF THE DRAWINGS

The included drawings are for illustrative purposes and serve only to provide examples of possible structures and arrangements for the disclosed inventive apparatuses and methods for integrated cooling for pole retainers. These drawings in no way limit any changes in form and detail that may be made to the disclosure by one skilled in the art without departing from the spirit and scope of the disclosure. The embodiments will be readily understood by the following detailed description in conjunction with the accompanying drawings, wherein like reference numerals designate like structural elements, and in which.

DETAILED DESCRIPTION OF SPECIFIC EMBODIMENTS

The following detailed description of example implementations refers to the accompanying drawings. The same reference numbers in different drawings may identify the same or similar elements.

The disclosure generally applies to the field of electric machines, more specifically to mechanical retention and cooling of rotor (rotary) and stator (stationary) poles. Typically, electric motor performance is limited by mechanical stress and thermal performance. Embodiments of the present disclosure allow pole retention hardware to not only provide mechanical functionality, but also function as a cooling manifold. The apparatus, system, and techniques described herein allow the pole retention hardware of the electric motor to function as a cooling manifold for removing heat generated by the electrical coils and/or permanent magnets. The apparatus, system, and techniques described herein can be particularly beneficial in the context of toroidal wound, axial-flux motors, allowing the coolant to be located adjacent to, or in close proximity to the loss sources (e.g., coil conductors and pole laminations). Moreover, embodiments of the present disclosure can be implemented on wound field rotor poles, allowing for direct-pole cooling and the use of permanent magnet rotor poles to remove heat resulting from rotor losses present in high-speed, permanent magnet machines.

Electric motors generate heat from various sources (e.g., generating a magnetic field by running a current through a wire coil). Current cooling techniques attempt to reduce the heat generated by the various sources by immersing the motor in a viscous cooling fluid. By immersing the motor in the viscous fluid, the speed of the motor can be limited because of the forces required to overcome the viscous drag of the fluid. These losses are more significant for larger motors. Previous pole retention devices were constructed using a solid metal mechanical mount mechanism or pole retainer, preventing the flow of coolant fluid through the pole retention devices. The techniques described herein allow operation of the motor at high speeds (e.g., greater than 3000 rotations per minute (RPM)). A motor that allows greater than 3000 RPM is provided as an example of a high-speed motor, but the actual speed is not a limitation of the present disclosure.

Figure 1:
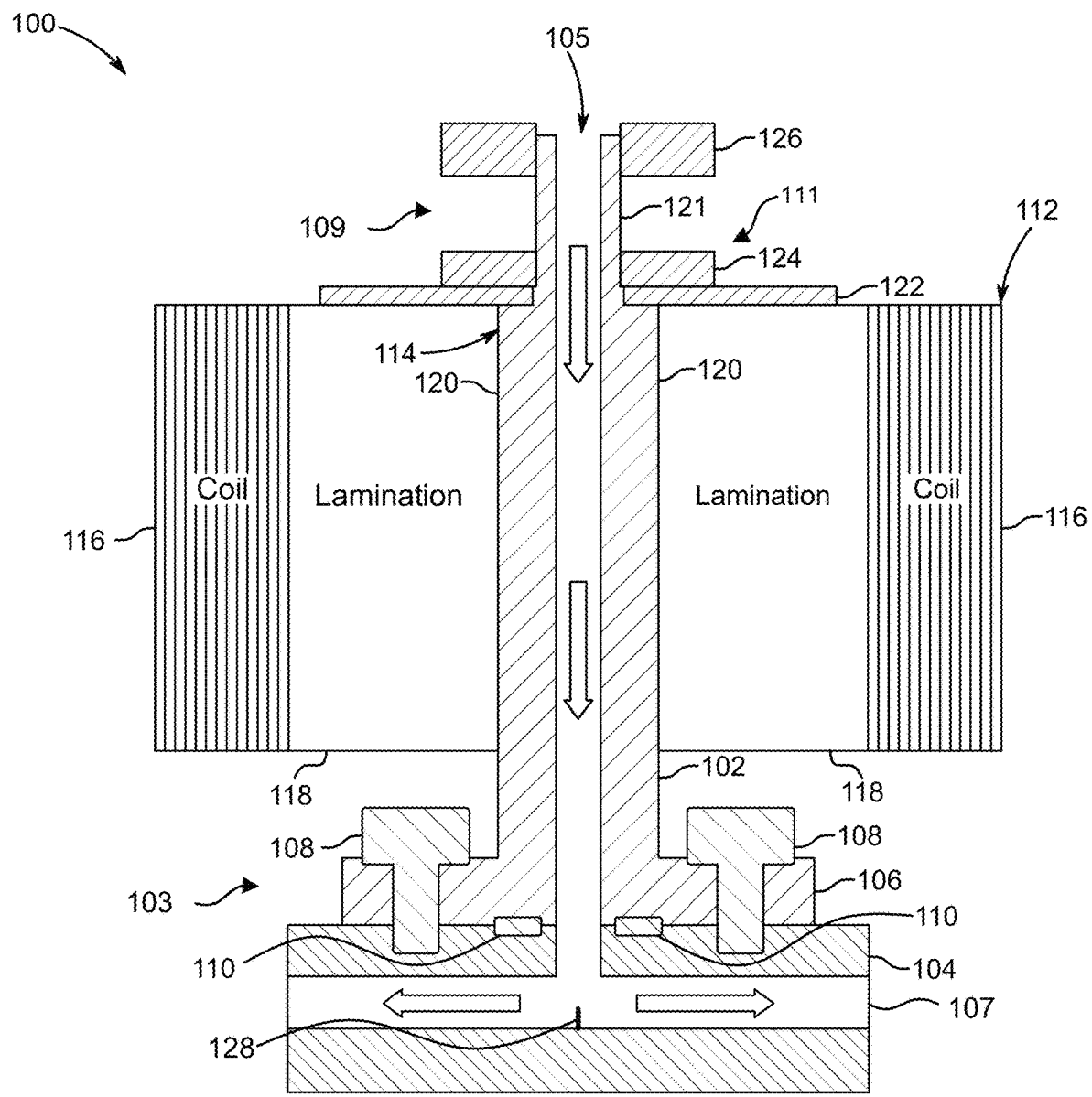
FIG. 1 illustrates an exemplary pole retainer cooler according to an embodiment of the present disclosure.

FIG. 1 illustrates a cut-away, profile view of a pole retainer cooler 100 according to an embodiment of the present disclosure. The pole retainer cooler 100 can include a pole retainer 102. The pole retainer 102 retains the pole 112 to the hub 104. The pole retainer 102 can be formed of a metal (e.g., iron or titanium) or an alloy of metals (e.g., steel). The pole retainer 102 can include a proximal end 103 and a distal end 109. The proximal end 103 of the pole retainer 102 can be mounted on the hub 104. A plurality of pole retainers 102 can be mounted on the hub 104. The pole retainer 102 can include a channel 105 formed through a center of the pole retainer 102 running from the proximal end 103 of the pole retainer 102 to the distal end 109 of the pole retainer 102. In various embodiments, the channel 105 can be drilled into the pole retainer 102. The pole retainer 102 can be coupled to the hub 104 via a hub mount 106. The hub mount 106 can also be known as the proximal mount 106. The hub mount 106 can be formed as part of the pole retainer 102 or formed as one or more separate components that can be coupled together as appropriate. The hub mount 106 can be coupled to the hub 104 using one or more fasteners 108. A fluid seal 110 can be positioned between the hub mount 106 and the hub 104 to prevent fluid leaks. The fluid seal 110 can include one or more O-rings.

The pole retainer 102 can be sized to fit within a recess 114 of a pole 112 in order to retain the pole 112 to the hub 104. In various embodiments, the recess 114 can be rectangular in shape. In various embodiments, the recess 114 can be sized to be slightly larger than the exterior dimensions of the pole retainer 102. This allows for thermal expansion and contraction of the pole retainer 102 and the pole 112. The pole 112 can include a plurality of windings of coil 116. The windings of coil 116 can generate a magnetic field as alternating current passes through the coil 116. The pole 112 can also include laminations 118 between the coil 116 and the pole retainer 102. The laminations 118 can minimize losses by directing magnetic flux and reducing eddy currents in the electric motor. Laminations can be made from a variety of materials.

In various embodiments, a thermally conductive compound 120 (e.g., a thermal paste, thermal interface pad, epoxy, etc.) can be applied between the pole retainer 102 and the interior surfaces of the recess 114 of the pole 112. The thermal compound 120 can facilitate the transfer of heat from the laminations 118 and the coil 116 to cooling fluid flowing through the channel 105. Liquid coolant (e.g., a liquid cooling fluid), for example, oil, can be circulated through the channel 105 as illustrated by the arrows shown in FIG. 1. The cooling fluid can absorb heat generated by the coils 116 and/or permanent magnets.

Coolant fluids can be any fluid or gas that are in current use, such as fresh-water, sea-water, oil, glycol and glycol mixes or cryogenic fluids such liquid nitrogen, etc. Other coolants can include air or other gases, in liquid or gaseous state.

The distal end 109 of the pole retainer 102 can include a pole mount 111 (otherwise known as distal mount) that can be configured to retain the pole 112 on the hub 104. The distal end 109 of the pole retainer 102 can include a plurality of threads 121. A washer plate 122 and a retaining nut 124 can secure the pole 112 onto the pole retainer 102. The distal end 109 of the pole retainer 102 can also include a fluid connection 126. The fluid connection 126 can connect the channel 105 to a fluid transfer duct. The fluid transfer duct can be a tube, a duct, a manifold, or some combination thereof.

The hub 104 can include a manifold 107. The manifold 107 can be an integrated fluid manifold 107. The manifold 107 can allow the transfer of cooling fluid from one pole to the adjacent pole (not shown). The manifold 107 can also transfer the cooling fluid to or from a pump or to or from a reservoir. The reservoir stores cooling fluid until it is required. Excess cooling fluid stays in the reservoir until the system cools down enough to create negative pressure and draw the excess coolant from the reservoir back into circulation. While the arrows shown in FIG. 1 depict the direction of flow of the cooling fluid in the channel 105 and the manifold 107 as flowing from the distal end 109 to the proximal end 103, the actual direction of the flow of the cooling fluid can vary depending on the application. For example, in some poles, the fluid flow can flow from the proximal end to the distal end or vice versa. Similarly, the direction of flow of the cooling fluid in the manifold can be either in the illustrated directions or in opposite directions. One of ordinary skill in the art would recognize many variations, modifications, and alternatives.

A temperature probe 128 can be installed in the manifold 107. In various embodiments, the temperature probe 128 can be installed in the channel 105, the fluid transfer duct 208, shown in FIG. 2, or a radiator, not shown. In various embodiments, multiple temperature probes 128 can be installed in the fluid path. The temperature probe 128 can measure the temperature of the cooling fluid. One or more temperature probes 128 can provide an estimate of the effectiveness of the cooling fluid in reducing heat from the coils.

Figure 2:
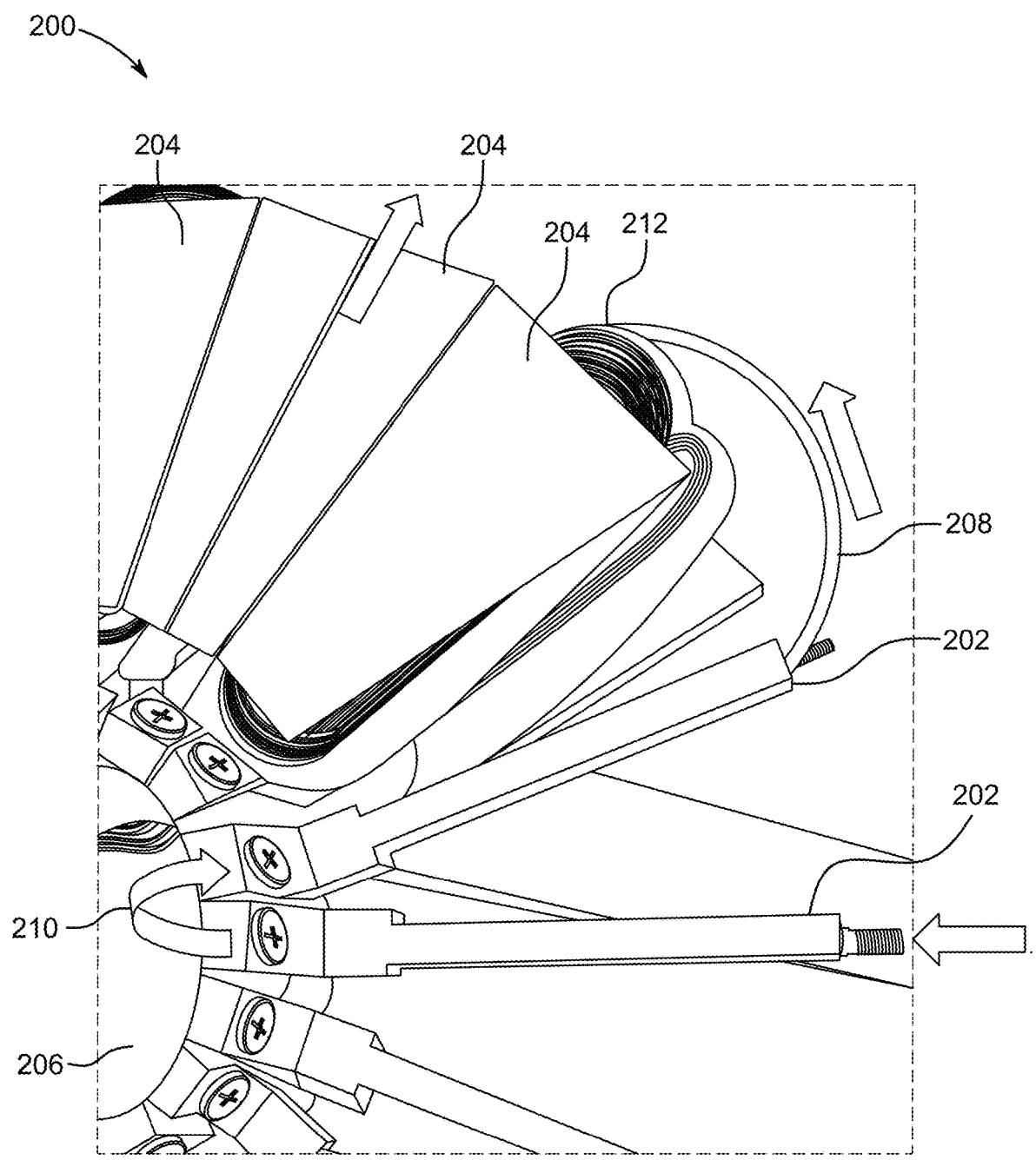
FIG. 2 illustrates an exemplary pole retainer cooler integrated with a hub according to an embodiment of the present disclosure.

FIG. 2 illustrates a portion of an exemplary pole retainer cooler 200 according to an embodiment of the present disclosure with arrows which indicate a path for coolant to flow. This coolant is typical, but other series-parallel flow configurations are possible. The exemplary pole retainer cooler 200 illustrated in FIG. 2 can correspond to the pole retainer cooler 100 as shown in FIG. 1. FIG. 2 illustrates a plurality of pole retainers 202, a plurality of stator poles 204, and a hub 206. The pole retainers 202 can correspond to pole retainer 102 as shown in FIG. 1. Each of the pole retainers 202 can be configured to retain a stator pole 204 to the hub 206. A fluid transfer duct 208 can transfer cooling fluid from a channel in a pole retainer 202 to a channel in an adjoining pole retainer 202. The hub 206 can include a manifold 210 that facilitates the flow of cooling fluid between the pole retainers 202 once the cooling fluid has passed through the channel in the corresponding pole retainer. FIG. 2 also illustrates a coil of wire 212 that wraps around a stator pole 204.

Figure 3:
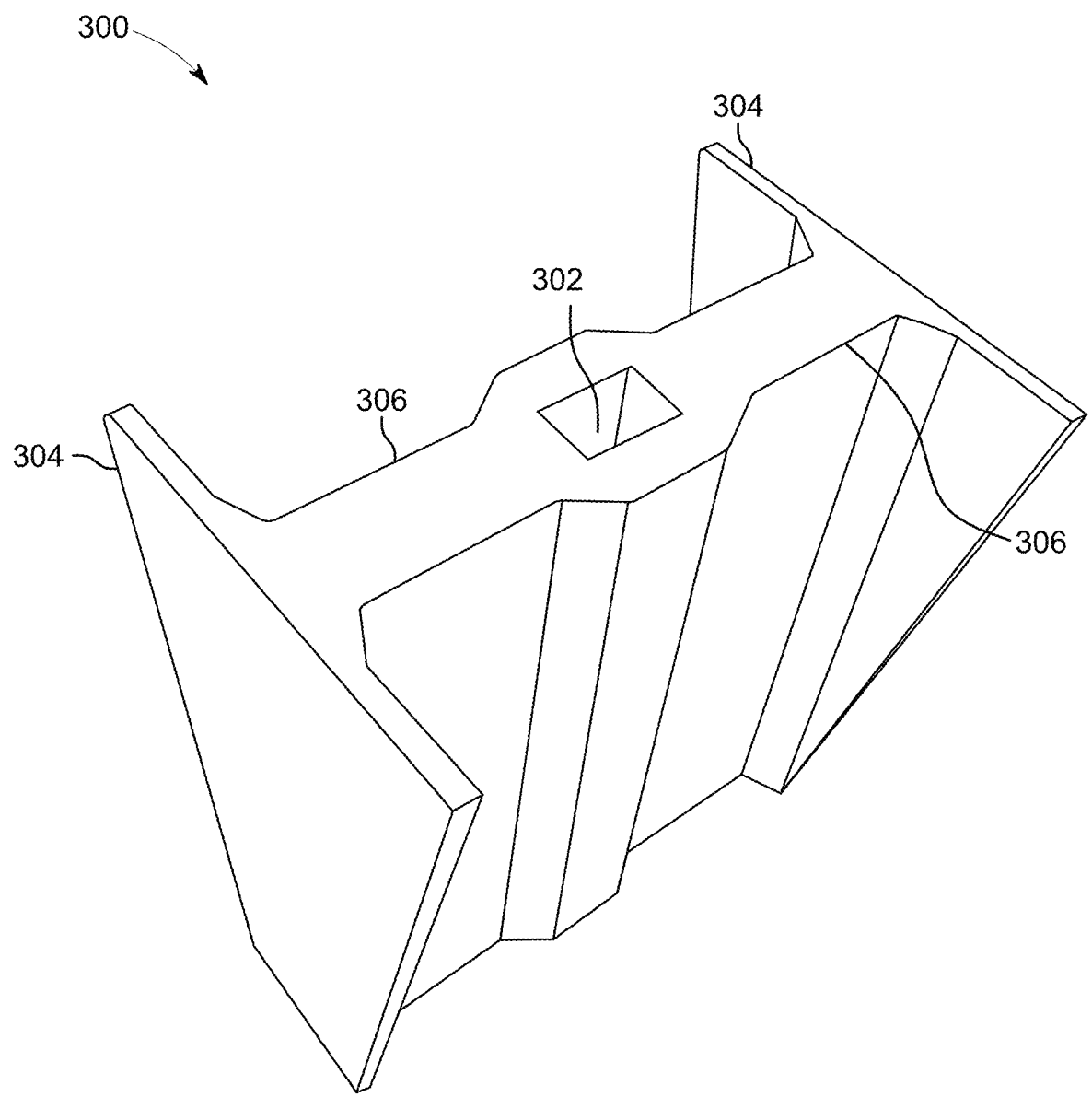
FIG. 3 illustrates an exemplary TORUS Axial Flux Permanent Magnetic motor pole with pole windings removed from image for clarity according to an embodiment of the present disclosure.

FIG. 3 illustrates an exemplary toroidally wound (TORUS) AFPM motor pole 300 according to an embodiment of the present disclosure. The motor pole 300 can be cast using a metal (e.g., iron) metal alloy (e.g., steel), forged, machined, stacked individual sheet metal laminations or suitable processes. The TORUS AFPM motor pole 300 can include a recess 302. The recess 302 can be sized to receive the pole retainer 202 as shown in FIG. 2. In various embodiments, the recess 302 can be rectangular although other geometric shapes are included within the scope of the present disclosure. The pole 300 can include an end plate 304 at the end of each arm 306 of the motor pole 300. Coil 116, as shown in FIG. 1, can be wound around the each arm 306 of the motor pole 300. The coil 116 can generate a magnetic field when alternating current is routed through the coil 116. Laminations 118, as shown in FIG. 1, can be formed around each arm 306 of the motor pole 300.

In addition to the stationary stators illustrated in FIGS. 2 and 3, the cooling structures and techniques described herein can be applied to rotating components such as an electric motor rotor (e.g., a salient pole rotor).

Figure 4:
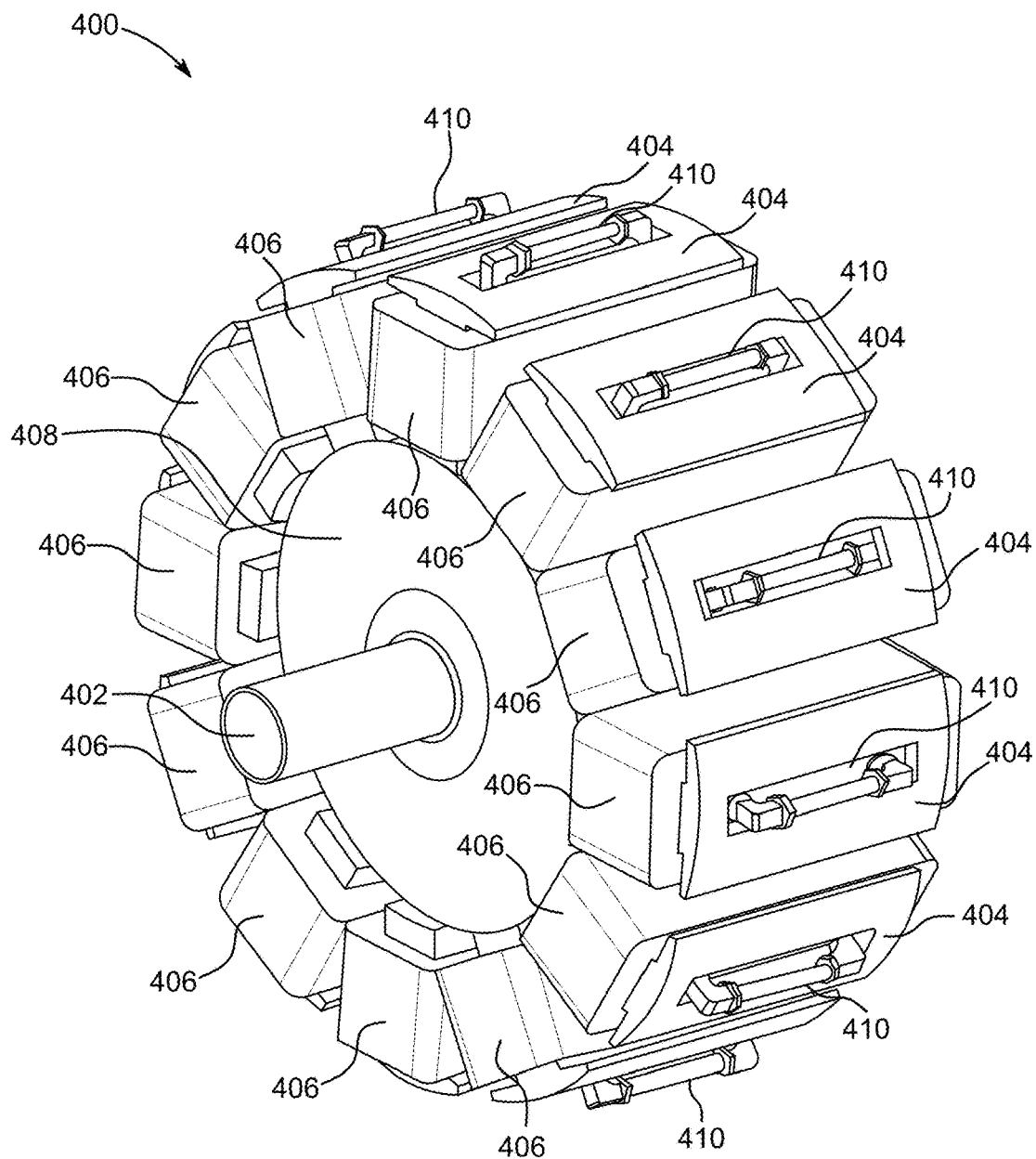
FIG. 4 illustrates an exemplary isometric view of a wound field salient pole synchronous rotor assembly with direct pole cooling system according to an embodiment of the present disclosure.

FIG. 4 illustrates an exemplary isometric view of a salient pole direct pole cooling system 400 according to an embodiment of the present disclosure. Salient pole rotors can be large in diameter in comparison to their length. They can be used in low speed electrical machines (e.g., electrical machines operating in the range of 100 RPM to 1500 RPM).

Salient pole rotors can include damper windings to avoid oscillations of rotors during operation.

The direct pole cooling system 400 can be coupled to a rotor shaft 402 of an electric motor. The electric motor can include a plurality of poles 404. Each pole of the plurality of poles 404 can retain a set of rotor pole coils 406. An alternating current is passed through each set of the rotor pole coils 406 and heat is generated. A plurality of channels (not shown) can pass through each pole of the plurality of poles 404. Cooling fluid can pass through the plurality of channels. The cooling fluid can absorb heat that is generated by the rotor pole coils 406. The plurality of channels can connect to a manifold (not shown) inside the hub 408. The channels can also connect to cooling manifolds 410. The cooling manifolds 410 can radiate the heat absorbed by the cooling fluid as the rotor shaft 402 rotates.

Figure 5:
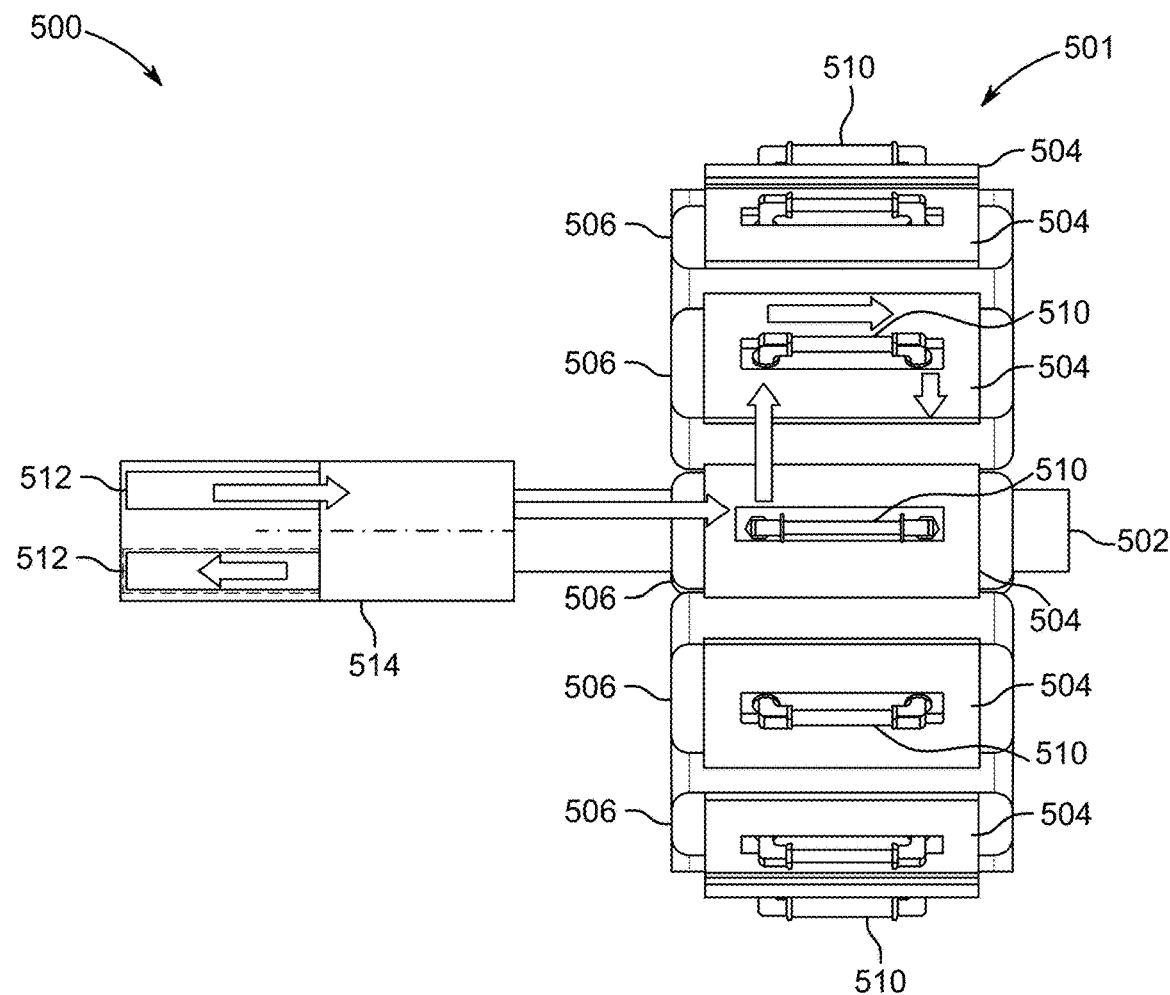
FIG. 5 illustrates a side view of a wound field salient pole synchronous rotor assembly direct pole cooling system according to an embodiment of the present disclosure.

FIG. 5 illustrates a side view of a salient pole direct pole cooling system 500 according to an embodiment of the present disclosure with arrows which indicate a path for coolant to flow. This coolant is typical, but other series-parallel flow configurations are possible. This configuration includes a rotary fluid coupler 514 to couple stationary coolant supply to the rotation coolant system. In other embodiments the cooling system could be integrated into the rotating assembly. The salient pole direct pole cooling system 500 corresponds the salient pole direct pole cooling system 400 of FIG. 4. The salient pole direct pole cooling system 500 can include a rotor 501 coupled to a rotor shaft 502 of an electric motor. The electric motor can include a plurality of poles 504. Each pole of the plurality of poles 504 can retain a set of rotor pole coils 506. An alternating current passes through each set of the rotor pole coils 506 and heat is generated. A plurality of channels (not shown) can pass through each pole of the plurality of poles 504. Cooling fluid can pass through the plurality of channels. The cooling fluid can absorb heat that is generated by the rotor pole coils 506. The plurality of channels can connect to a manifold in the hub 408 as shown in FIG. 4. The channels can also connect to cooling manifolds 510. The cooling manifolds can radiate the heat absorbed by the cooling fluid as the rotor shaft 502 rotates. The cooling fluid can be routed through a channel 512. As the rotor 501 rotates, a rotary union 514 can be used to transfer the cooling fluid to and from the channels 512 in the rotor 501. The cooling fluid can flow through a channel 512, then through the rotary union 514, and then through channels internal to the rotor (not shown) into a manifold of the rotor (not shown). The cooling fluid can flow through one or more channels in each of the poles 504 through various cooling manifolds 510 and exit the rotor through a channel 512 via the rotary union 514.

In various embodiments, one or more of a pump, a filter, and radiator can be connected to the channels. In this way, the pump can pressurize the fluid to flow through the channels. The filter can remove impurities from the cooling fluid. The radiator can allow the heat absorbed by the cooling fluid to be dissipated. The cooled, cooling fluid can return to the channel and the rotor via the rotary union 514 forming a closed loop system. The directional arrows indicating the directional flow of the cooling fluid shown in FIG. 5 are exemplary and the disclosure is not so limited and fluid flow can be directed in alternative directions. One of ordinary skill in the art would recognize many variations, modifications, and alternatives.

Figure 6:
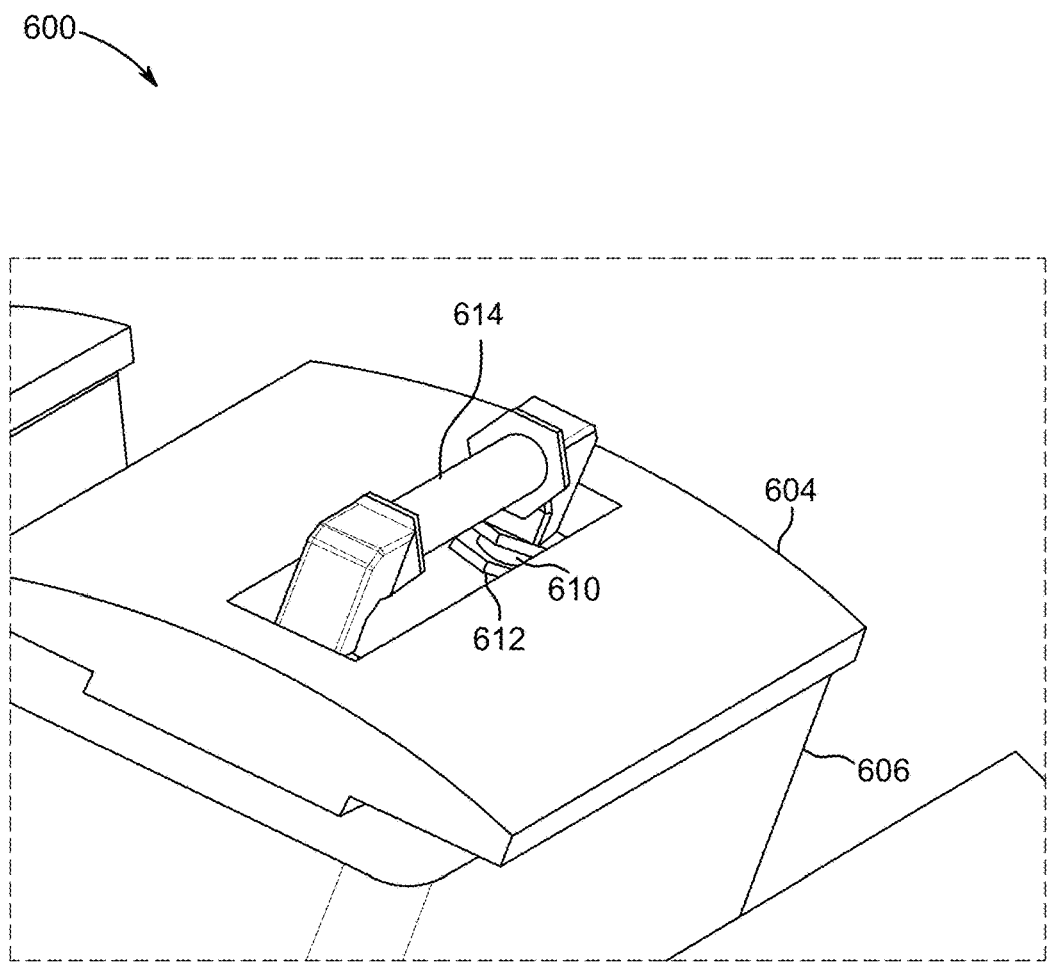
FIG. 6 illustrates a zoomed-in view of a pole of a wound field salient pole synchronous rotor assembly direct pole cooling system according to an embodiment of the present disclosure.

FIG. 6 illustrates a zoomed-in view of a pole of a salient pole direct pool cooling system 600 according to an embodiment of the present disclosure. The portion of the salient pole direct pole cooling system 600 illustrated in FIG. 6 corresponds to the salient pole direct pole cooling systems 400 and 500. The rotor pole 604 can retain a set of rotor pole coils 606. An alternating current passes through each set of the rotor pole coils 606, heat is generated. As shown in FIG. 6, a cooling manifold 614 is connected to a channel that passes through the rotor pole 604. Cooling fluid can pass through the cooling manifold 614 to allow the fluid to cool via radiation. The pole retainer 610 can be threaded to allow the rotor pole 604 to be secured with a nut 612.

Figure 7:
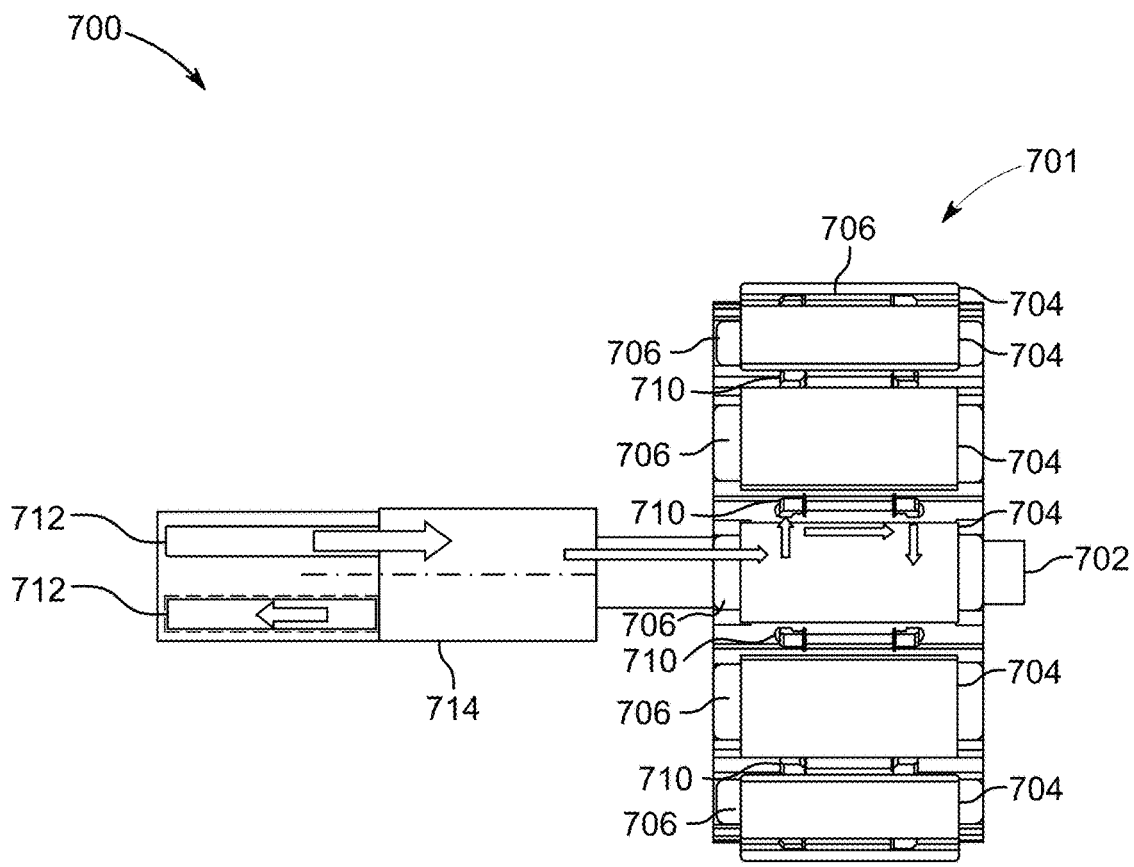
FIG. 7 illustrates a side view of a salient pole retainer cooler according to an embodiment of the present disclosure.

FIG. 7 illustrates a side view of another exemplary embodiment of a salient pole retainer cooler 700 according to an embodiment of the present disclosure. The salient pole retainer cooler 700 is similar to the salient pole direct pole cooling system 500 as illustrated in FIG. 5. However, the cooling manifolds 710 are attached on top of a wedge positioned between each of the rotor poles 704 and rotor pole coils 706 instead of through the rotor poles 504 as shown in FIG. 5.

The direct pole cooling system 700 can include a rotor 701 coupled to a rotor shaft 702 of an electric motor. The electric motor can include a plurality of poles 704. Each pole of the plurality of poles 704 can retain a set of rotor pole coils 706. An alternating current passes through each set of the rotor pole coils 706, heat is generated.

A plurality of channels (not shown) can pass through a wedge positioned between each pole of the plurality of poles 704. Cooling fluid can pass through the plurality of channels. The cooling fluid can absorb heat that is generated by the rotor pole coils 706. The plurality of channels can connect to a manifold in the hub, not shown. The channels can also connect to cooling manifolds 710. The cooling manifolds can transfer the heat absorbed by the cooling fluid as the rotor shaft 702 rotates. The cooling fluid can be routed through a channel 712. As the rotor 701 rotates, a rotary union 714 can be used to transfer fluid to and from the channels in the rotor 701. The cooling fluid can flow through a channel 712 through the rotary union 714 through channels internal to the rotor (not shown) into a manifold of the rotor (not shown) through one or more channels in each of the wedges that are positioned between the poles 704 through various cooling manifolds 710 and exit the rotor through a channel 712 via the rotary union 714.

Figure 8:
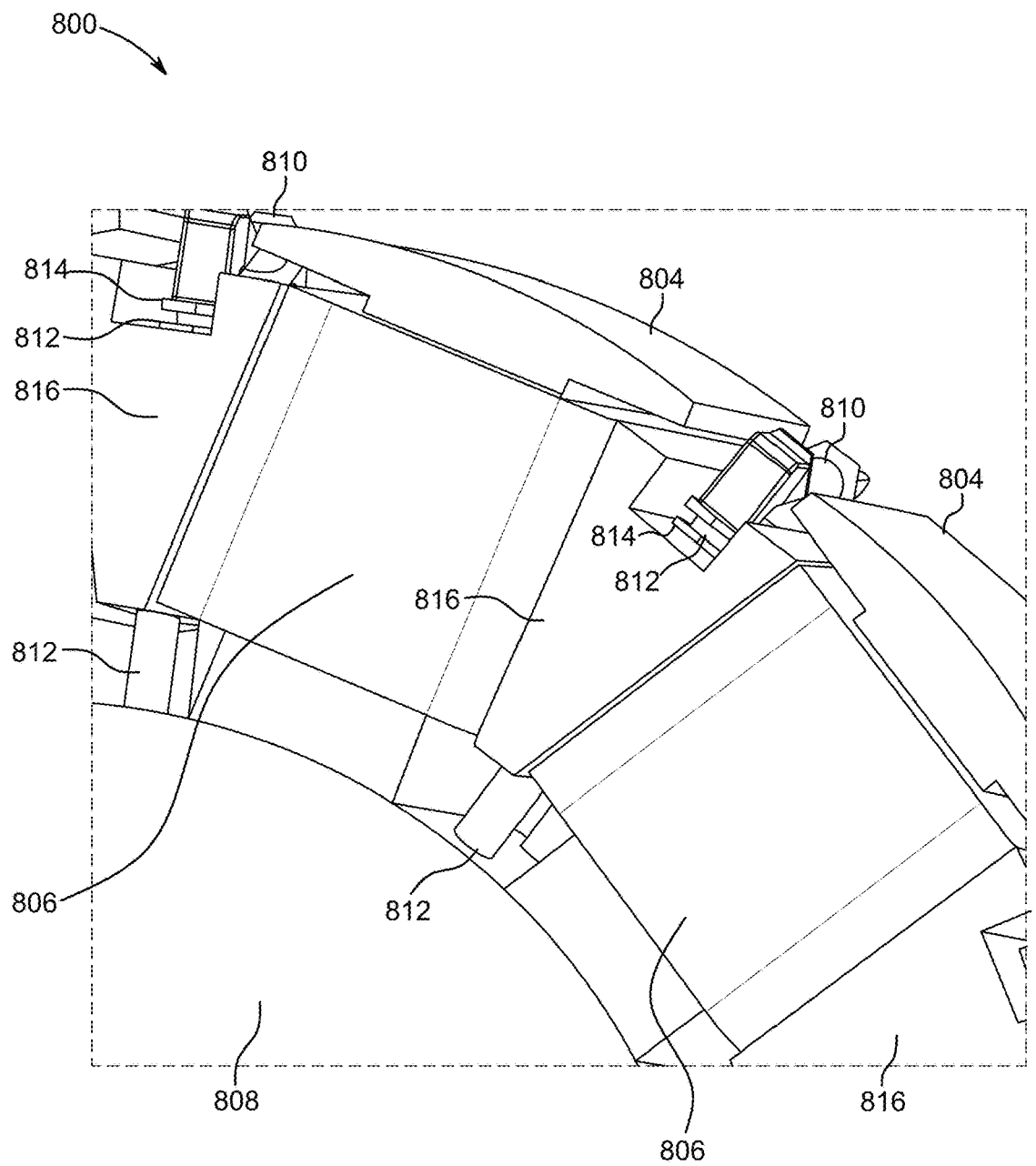
FIG. 8 illustrates a zoomed-in view of a pole and retainer of a salient pole retainer cooler according to an embodiment of the present disclosure.

FIG. 8 illustrates a zoomed-in view of a portion of a pole retainer cooling system 800 according to an embodiment of the present disclosure. FIG. 8 is not drawn to scale for purposes of illustration. FIG. 8 illustrates a plurality of rotor poles 804 that retain rotor pole coils 806 to a hub 808. The cooling manifolds 810 can be attached to a wedge 816 via a threaded pole retainer 812 using a fastener 814 (e.g., a retaining nut). The pole retainer 812 can include a channel for circulating cooling fluid from a manifold in the hub 808, through the wedge 816 positioned between the rotor coils 806, through the cooling manifold 810, and then back to the manifold in the hub 808. The cooling fluid can absorb the heat generated by the coils 806.

Figure 9:
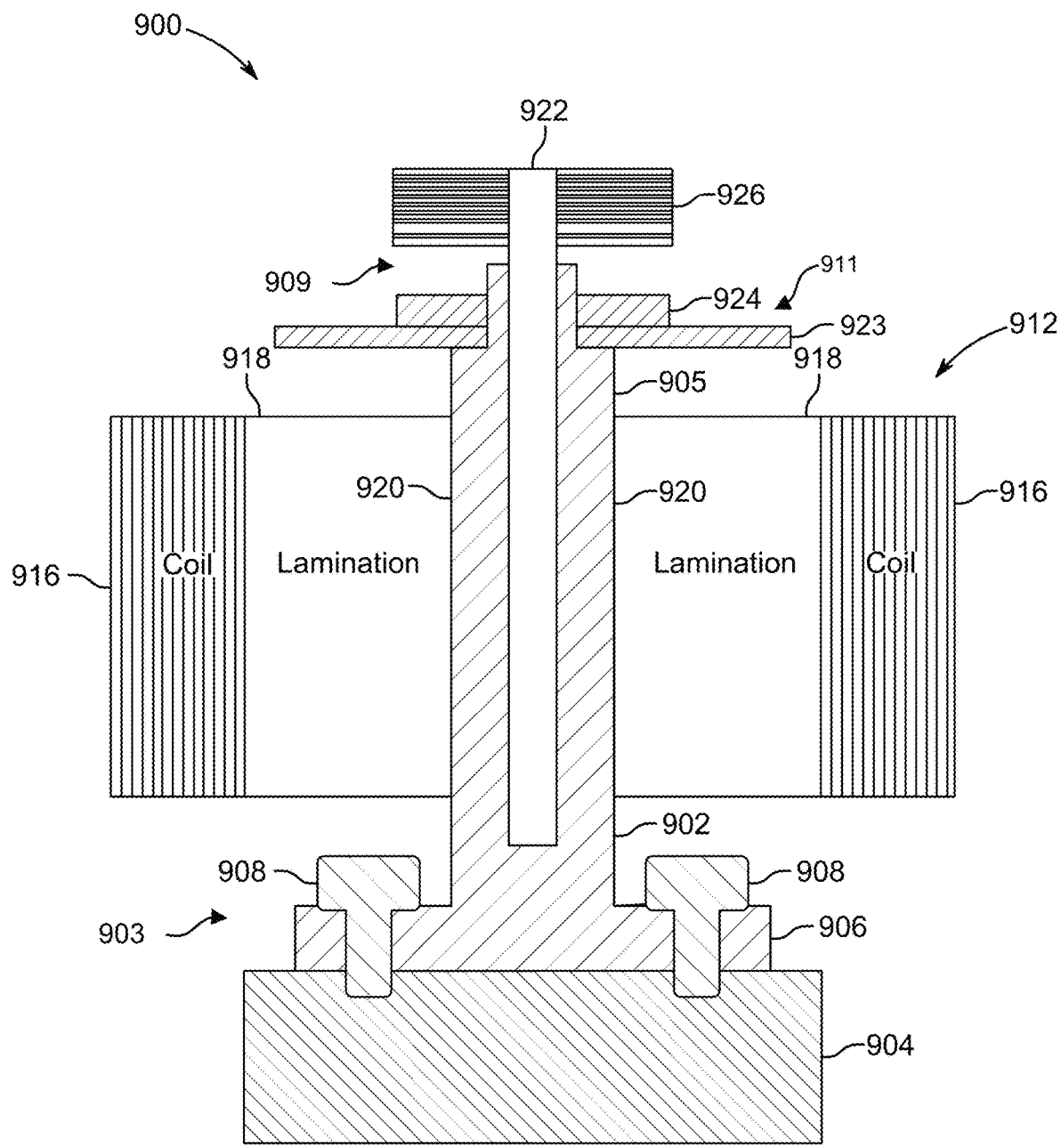
FIG. 9 illustrates an exemplary heat pipe integrated pole retainer according to an embodiment of the present disclosure.

FIG. 9 illustrates a cut-away profile view of an exemplary heat pipe integrated pole retainer apparatus 900 according to an embodiment of the present disclosure. In this arrangement the heat pipe(s) replacing a conventional fluid cooled system, eliminating the need for fluids for coolant. The pole retainer apparatus 900 can include a pole retainer 902. The pole retainer 902 can be formed of a metal (e.g., iron or titanium) or an alloy of metals (e.g., steel). The pole retainer 902 can include a proximal end 903 and a distal end 909. The proximal end 903 of the pole retainer 902 can be mounted on the hub 904. The pole retainer 902 can include a channel 905 formed through a center of the pole retainer 902. The pole retainer 902 can be coupled to the hub 904 via a hub mount 906. The hub mount 906 can be formed as part of the pole retainer 902 or formed as one or more separate components that are coupled together. The hub mount 906 can be coupled to the hub 904 using one or more fasteners 908.

The pole retainer 902 can be sized to fit within a recess of a pole 912 in order to retain the pole 912 to a hub 904. In various embodiments, the recess can be rectangular in shape. The pole 912 can include a plurality of windings of coil 916. The windings of coil 916 can produce a magnetic field as alternating current passes through the coil 916. The pole can also include laminations 918 between the coil 916 and the pole retainer 902. The laminations 918 can minimize losses by directing magnetic flux and reducing eddy currents in the motor.

In various embodiments, a thermal compound 920 (e.g., a thermal paste) can be applied between the pole retainer 902 and the interior surfaces of the recess of the pole 912. The thermal compound 920 can facilitate the transfer of heat from the laminations 918 and the coil 916 to a heat pipe 922 disposed in the channel 905. A heat pipe 922 is a heat-transfer device that combines the principles of both thermal conductivity and phase transition to effectively transfer heat between two solid interfaces. At the hot interface of a heat pipe 922, a liquid in contact with a thermally conductive solid surface turns into a vapor by absorbing heat from that surface. The vapor then travels along the heat pipe 922 to the cold interface and condenses back into a liquid, releasing the latent heat. The liquid then returns to the hot interface through either capillary action, centrifugal force, or gravity, and the cycle repeats. Due to the very high heat transfer coefficients for boiling and condensation, heat pipes 922 are highly effective thermal conductors.

The distal end 909 of the pole retainer 902 can include a pole mount 911 that can be configured to retain the pole 912 on the hub 904. The distal end 909 of the pole retainer 902 can be threaded. A washer plate 923 and a retaining nut 924 can secure the pole 912 onto the pole retainer 902. The distal end 909 of the pole retainer 902 can also include a condenser 926. The condenser 926 can connect the heat pipe 922 to allow transfer of heat from the heat pipe 922 through one or more fins present on the condenser 926 and/or a coolant reservoir of water, oil, air, or the like. The one or more fins (e.g., condenser fins) can be thin metal slats that run along the outline of the heat exchanger. The purpose of the one or more fins can be to move warm air away from the heat exchanger during operation of the electric motor.

Figure 10:
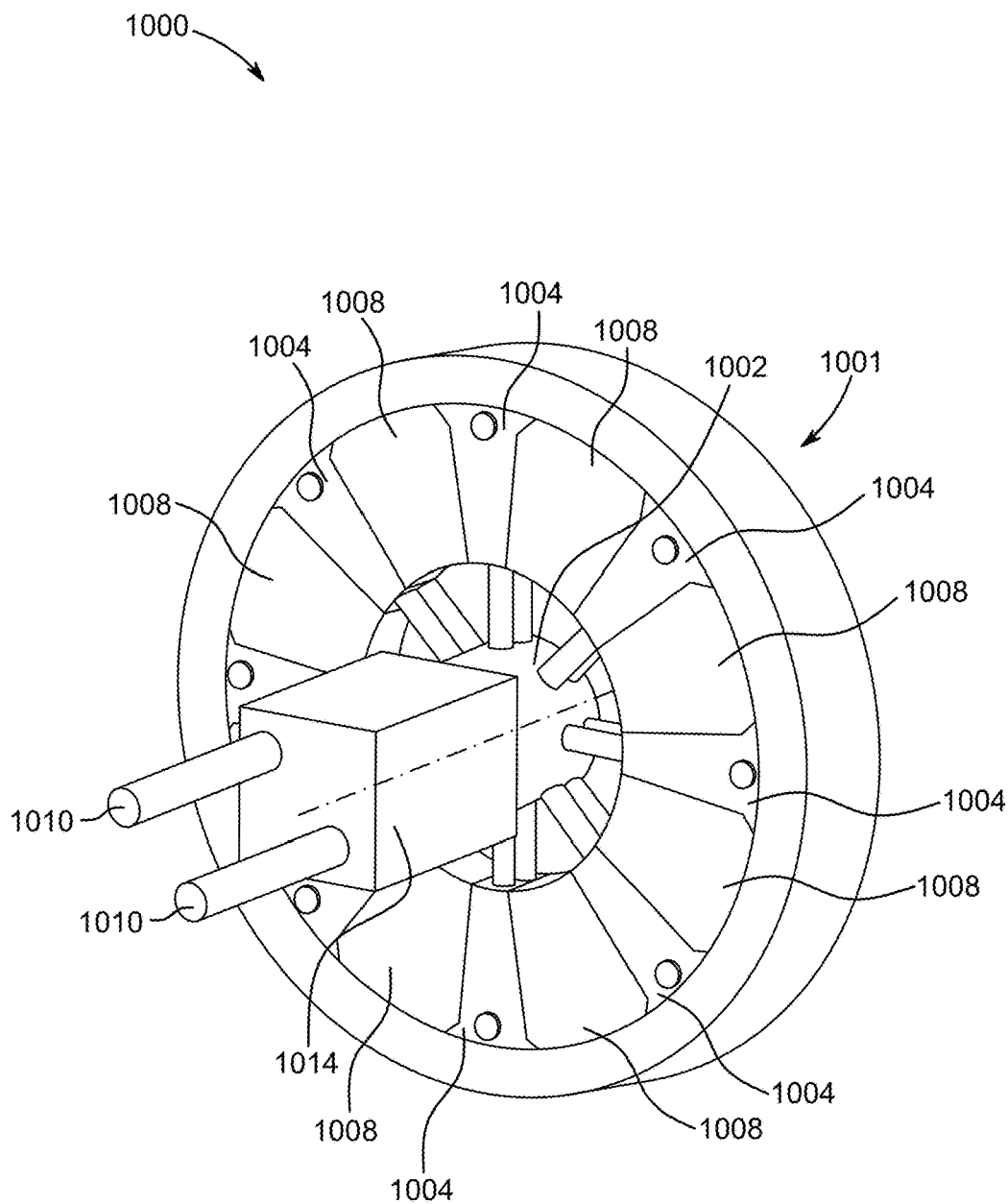
FIG. 10 illustrates a profile view of a first exemplary rotor cooling system for an axial field topology according to an embodiment of the present disclosure.

FIG. 10 illustrates a profile view of an axial field topology cooling system 1000 according to an embodiment of the present disclosure. This configuration includes a rotary fluid coupler (item 1014) to couple stationary coolant supply to the rotation coolant system. In other embodiments the cooling system could be integrated into the rotating assembly. An axial field electric motor comprises one or more elements such as a rotor mounted for rotation and multiple axial flux permanent magnets carried by the rotor. The axial flux permanent magnets are oriented such that an associated magnetic flux produced thereby is at least substantially axially oriented. The axial flux permanent magnets can be positioned around the rotor with alternating orientations of flux direction so that a flux direction of adjacent magnets is at least substantially axially oriented but opposite in direction. The radial flux permanent magnets are also carried by the rotor and oriented so that an associated magnetic flux produced is at least substantially radially oriented.

Instead of coils, the rotor illustrated in FIG. 10 uses permanent magnets 1008 separated by pole retainers 1004 for the axial field topology cooling system 1000. The pole retainers 1004 can secure the one or more permanent magnets 1008 to the rotor 1001. As permanent magnets exceed a threshold temperature (e.g., 80° C.), the permanent magnets 1008 can lose magnetism or even become permanently demagnetized if heated above their Curie temperature. Therefore, embodiments of the present disclosure provide methods and systems to cool the permanent magnets 1008 utilized in the axial field topology cooling system 1000 illustrated in FIG. 10. The channels that pass through the pole retainers 1004 allow for the removal of heat from the rotor 1001 using the cooling fluid that flows through the channels in the pole retainers 1004 to implement heat transfer. In the embodiment of the present disclosure illustrated in FIG. 10, cooling fluid can be routed through the channel 1010 through a rotary union 1014, then flow through channels 1010 in the rotor shaft 1002. The rotary union 1014 allows for connection of a cooling medium to the rotating components of the rotor. The cooling fluid can be routed through a manifold in the rotor shaft 1002, through a channel 1010, and through cooling ducts to the pole retainers 1004.

Figure 11:
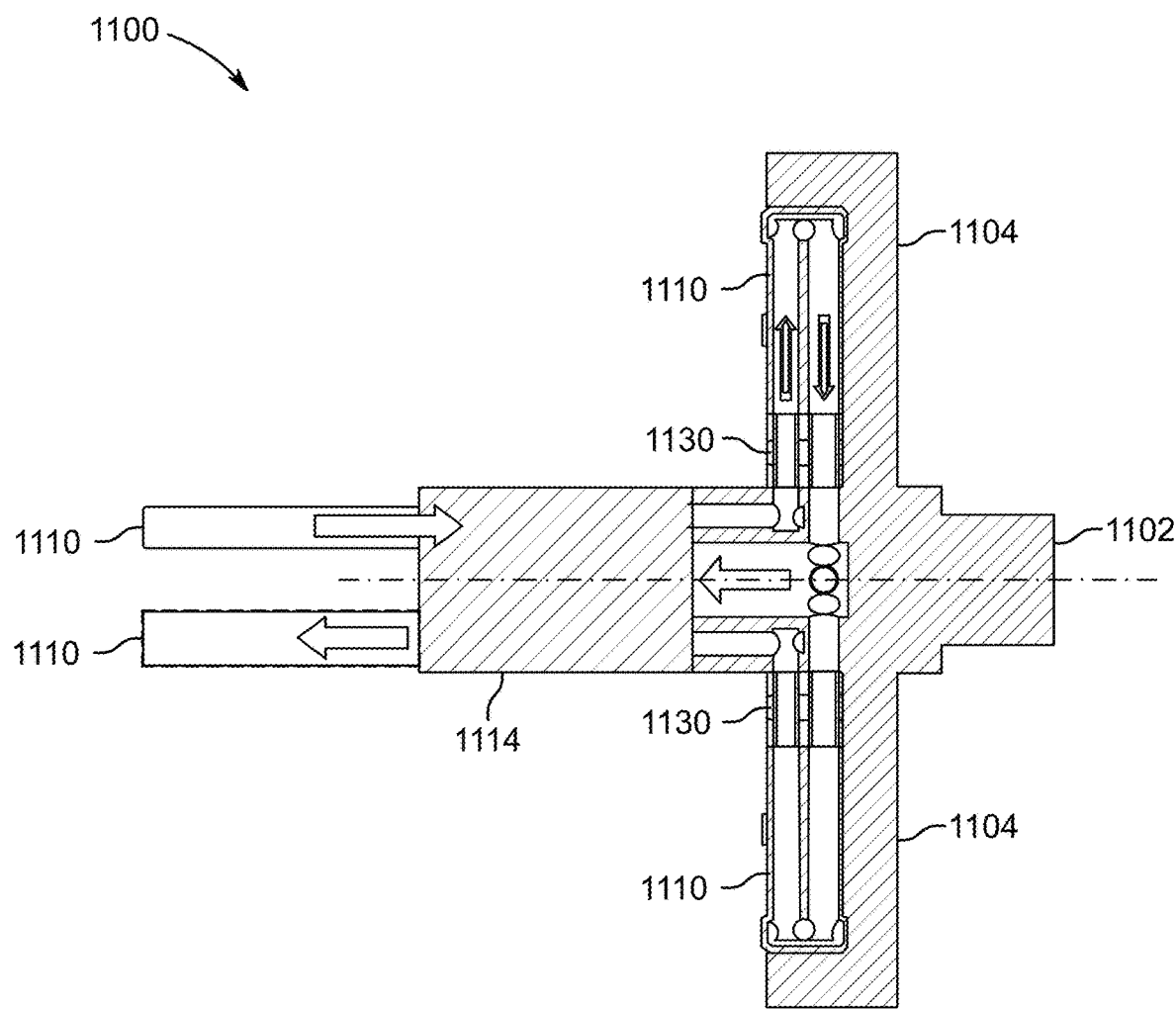
FIG. 11 illustrates a cross-sectional view of an exemplary rotor cooling system for an axial field topology according to an embodiment of the present disclosure.

FIG. 11 illustrates a cross-sectional view of an exemplary rotor cooling system 1100 for an axial field topology according to an embodiment of the present disclosure, with arrows which indicate a path for coolant to flow. This coolant is typical, but other series-parallel flow configurations are possible. The exemplary rotor cooling system 1100 corresponds to the rotor cooling system shown in FIG. 10. FIG. 11 illustrates a rotor mounted on a rotor shaft 1102. The rotor can include a plurality of pole retainers 1104. Cooling fluid can be routed through channels 1110 through a rotary union 1114 to the channels 1110 passing through the pole retainers. The embodiment illustrated in FIG. 11 includes cooling ducts 1130 to route the cooling fluid from a manifold in the rotor shaft 1102 to the channels 1110 in the pole retainers 1104.

Figure 12:
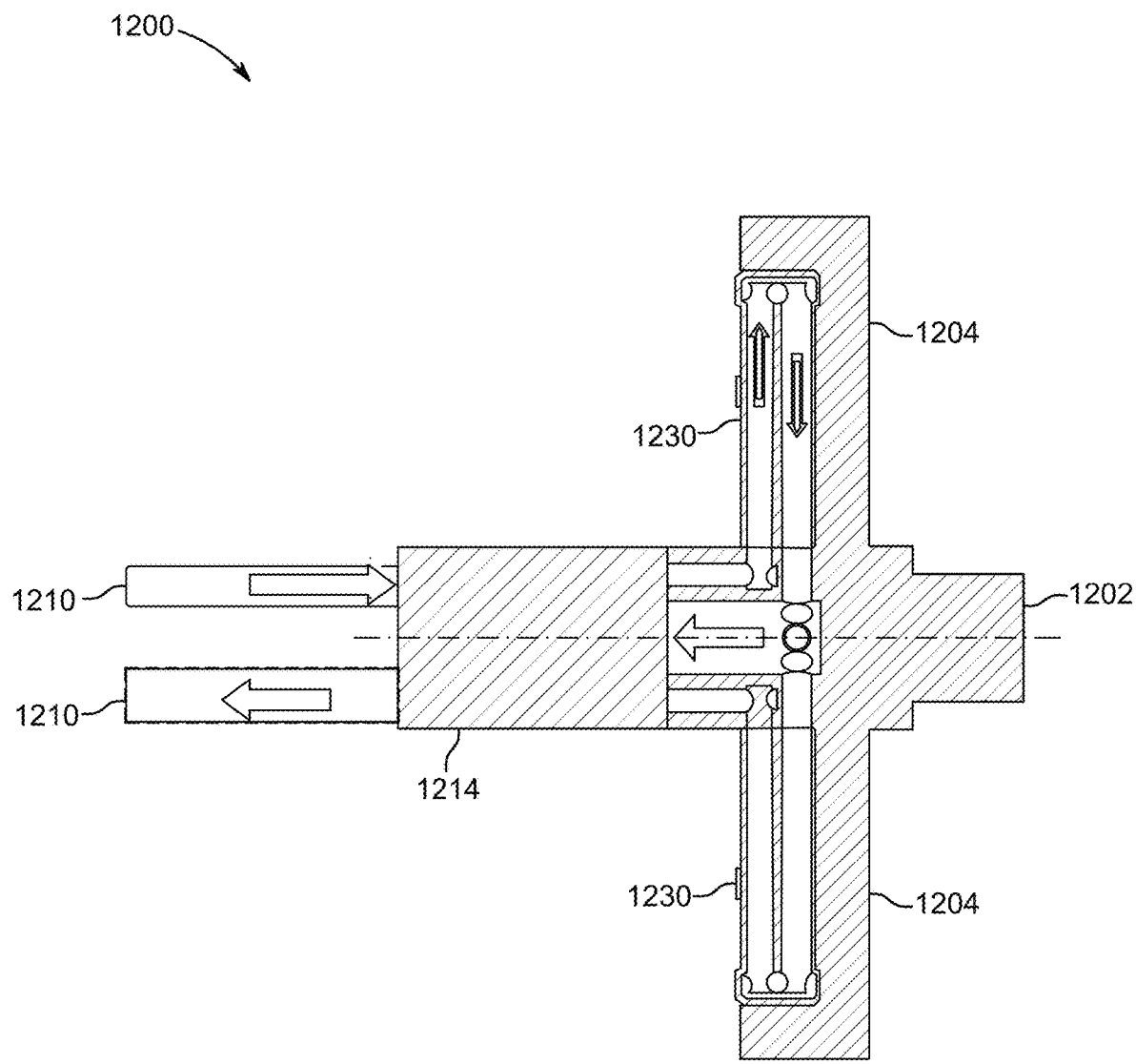
FIG. 12 illustrates an overhead view of a second exemplary rotor cooling system for an axial field topology according to an embodiment of the present disclosure.

FIG. 12 illustrates an overhead view of a second exemplary rotor cooling system 1200 for an axial field topology according to an embodiment of the present disclosure. The pole retainers 1204 for the second exemplary rotor cooling system 1200 extend from the rotor shaft 1202. Therefore, the cooling ducts 1130 illustrated in FIG. 11 are optional in this embodiment. Cooling fluid can be routed through channels 1210, through a rotary union 1214 to the channels 1230 passing through the pole retainers 1204, and back through the rotary union 1214.

Figure 13:
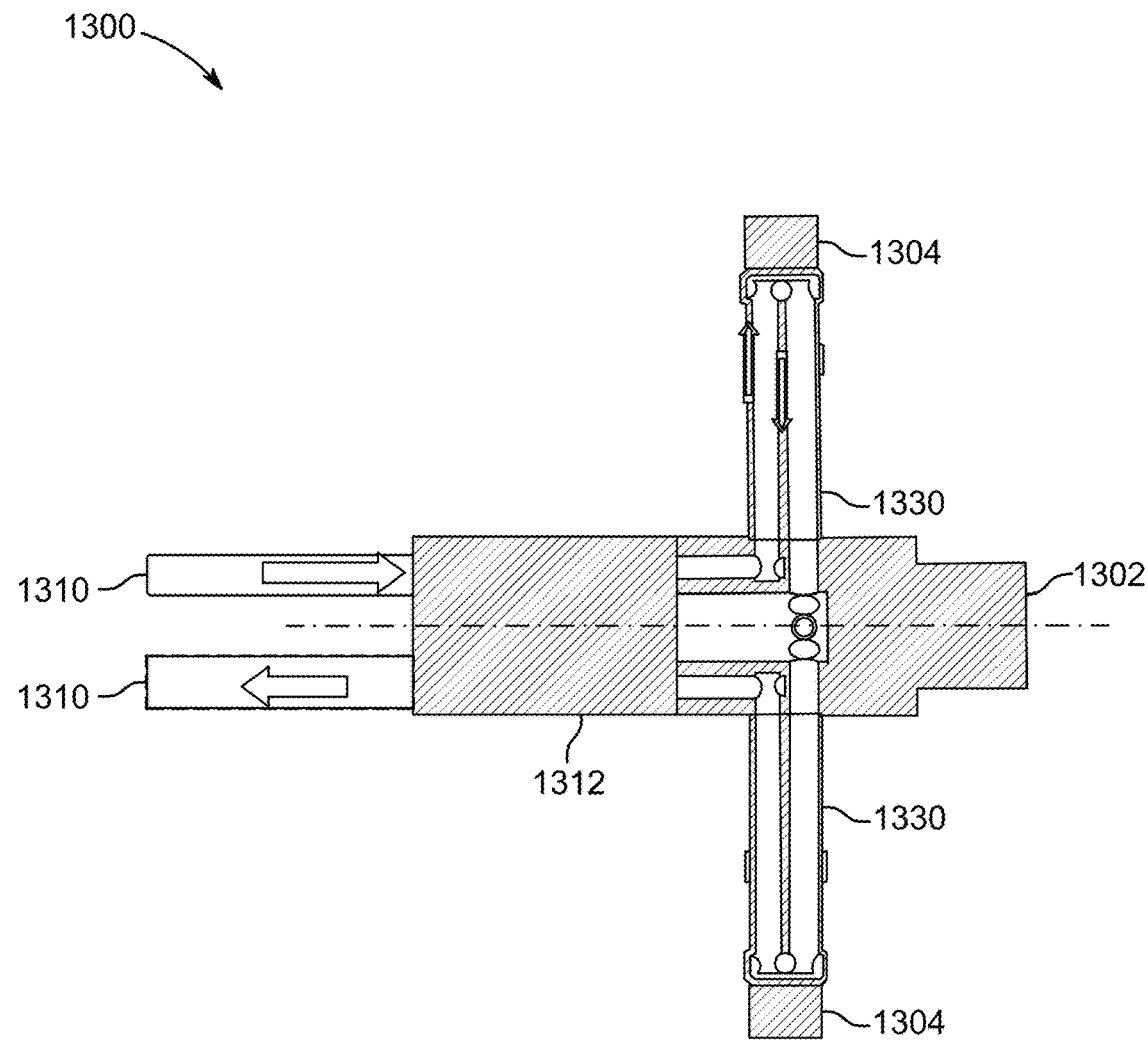
FIG. 13 illustrates an overhead view of a third exemplary rotor cooling system for an axial field topology according to an embodiment of the present disclosure.

FIG. 13 illustrates an overhead view of a third exemplary rotor cooling system 1300 for an axial field topology according to an embodiment of the present disclosure. The pole retainers 1304 for the third exemplary rotor cooling system 1300 extend from the rotor shaft 1302. In the embodiment illustrated for FIG. 13, the back iron topology illustrated in FIG. 12 is optional. The cooling ducts 1330 route fluid to and from the manifold in the rotor shaft 1302. Cooling fluid can be routed through channels 1310, through a rotary union 1312 to the channels 1310 passing through the pole retainers 1304, and back through the rotary union 1312.

Figure 14:
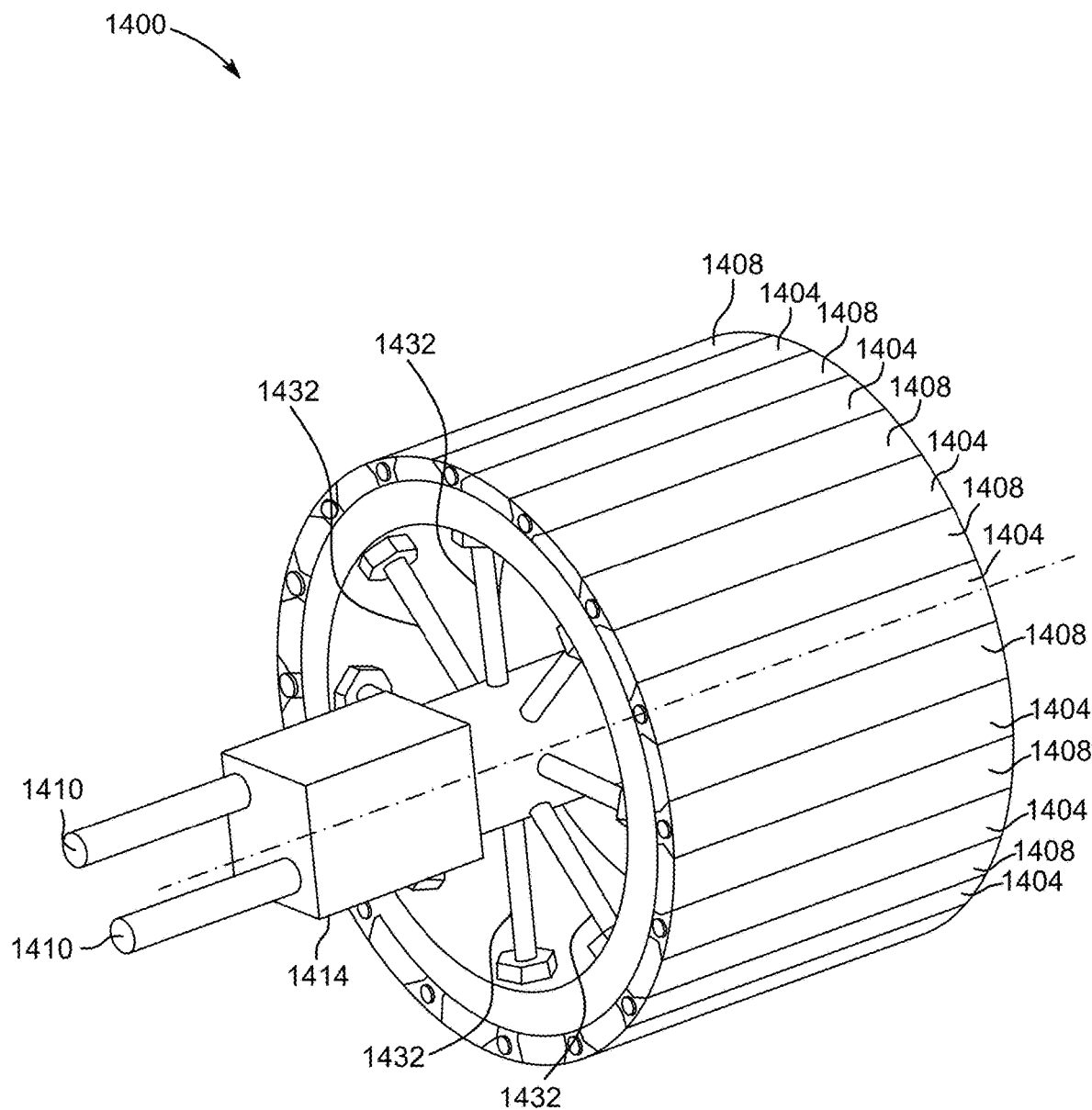
FIG. 14 illustrates a profile view of an exemplary rotor cooling system for a radial field topology according to an embodiment of the present disclosure.

FIG. 14 illustrates a profile view of an exemplary rotor cooling system 1400 for a radial field topology according to an embodiment of the present disclosure. FIG. 14 illustrates a rotor mounted on a rotor shaft 1402. The rotor can include a plurality of pole retainers 1404 that can retain a plurality of permanent magnets 1408. Cooling fluid can be routed through channels 1410, through a rotary union 1414, and to a manifold (not shown) in the rotor shaft 1402. The manifold can route cooling fluid through cooling ducts 1432 to the pole retainers 1404. The cooling fluid that is routed through channels 1410 in the pole retainers 1404 can absorb heat from the permanent magnets 1408 and be routed back through the cooling ducts 1432 to the manifold and the rotary union 1414 to a heat exchanger via channels 1410.

Figure 15:
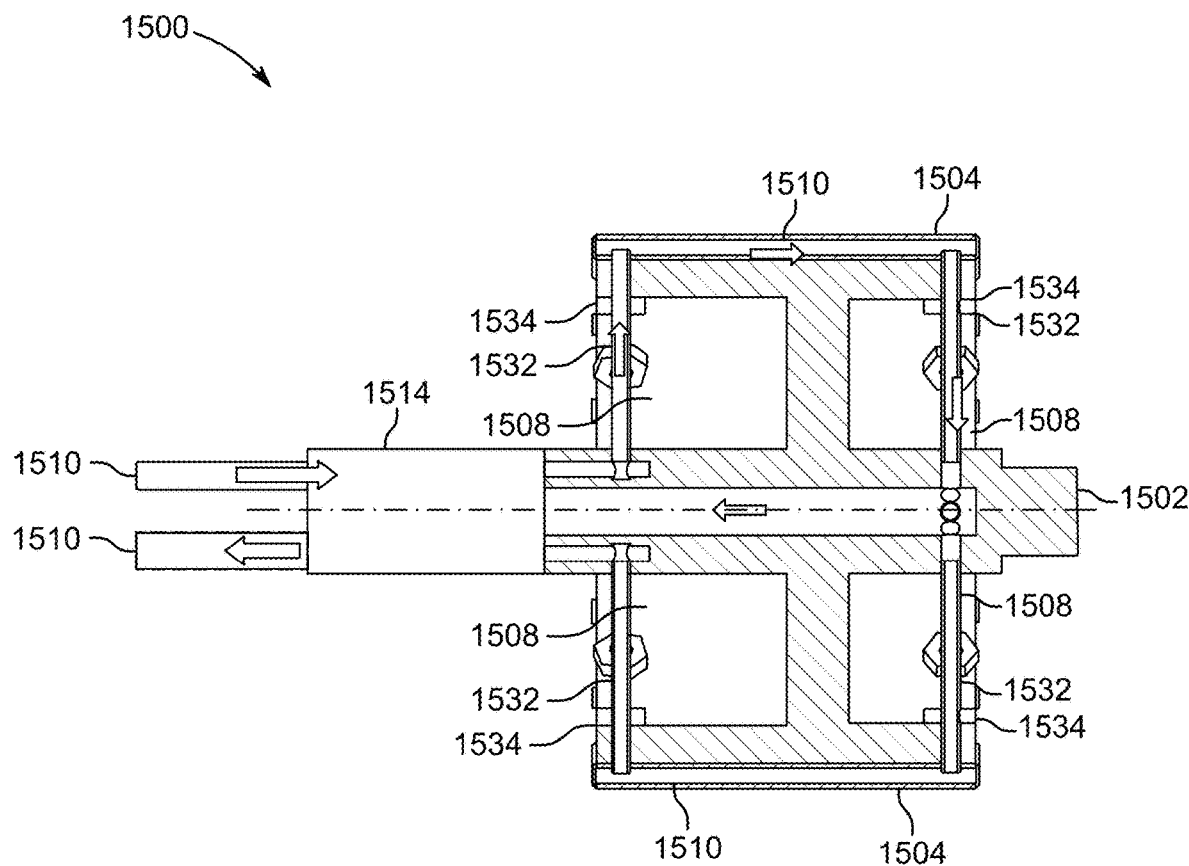
FIG. 15 illustrates an overhead view of an exemplary rotor cooling system for a radial field topology according to an embodiment of the present disclosure.

FIG. 15 illustrates an overhead cut-away view of an exemplary rotor cooling system 1500 for a radial field topology according to an embodiment of the present disclosure with arrows which indicate a path for coolant to flow. This coolant is typical, but other series-parallel flow configurations are possible. This configuration includes a rotary fluid coupler (item 514) to couple stationary coolant supply to the rotation coolant system. In other embodiments the cooling system could be integrated into the rotating assembly. FIG. 15 illustrates a rotor mounted on a rotor shaft 1502. The rotor can include a plurality of pole retainers 1504 that can retain a plurality of permanent magnets 1508. Cooling fluid can be routed through channels 1510 and through a rotary union 1514 to a manifold (not shown) in the rotor shaft 1502. The manifold can route cooling fluid through cooling ducts 1532 to the pole retainers 1504. The cooling fluid that is routed through channels 1510 in the pole retainers 1504 can absorb heat from the permanent magnets 1508 and be routed back through the cooling ducts 1532 to the manifold and the rotary union 1514 to a heat exchanger via channels 1510. In various embodiments, retainer hardware 1534 (e.g., a retaining nut) can be used to secure the cooling ducts 1532 to the pole retainers 1504.

Figure 16:
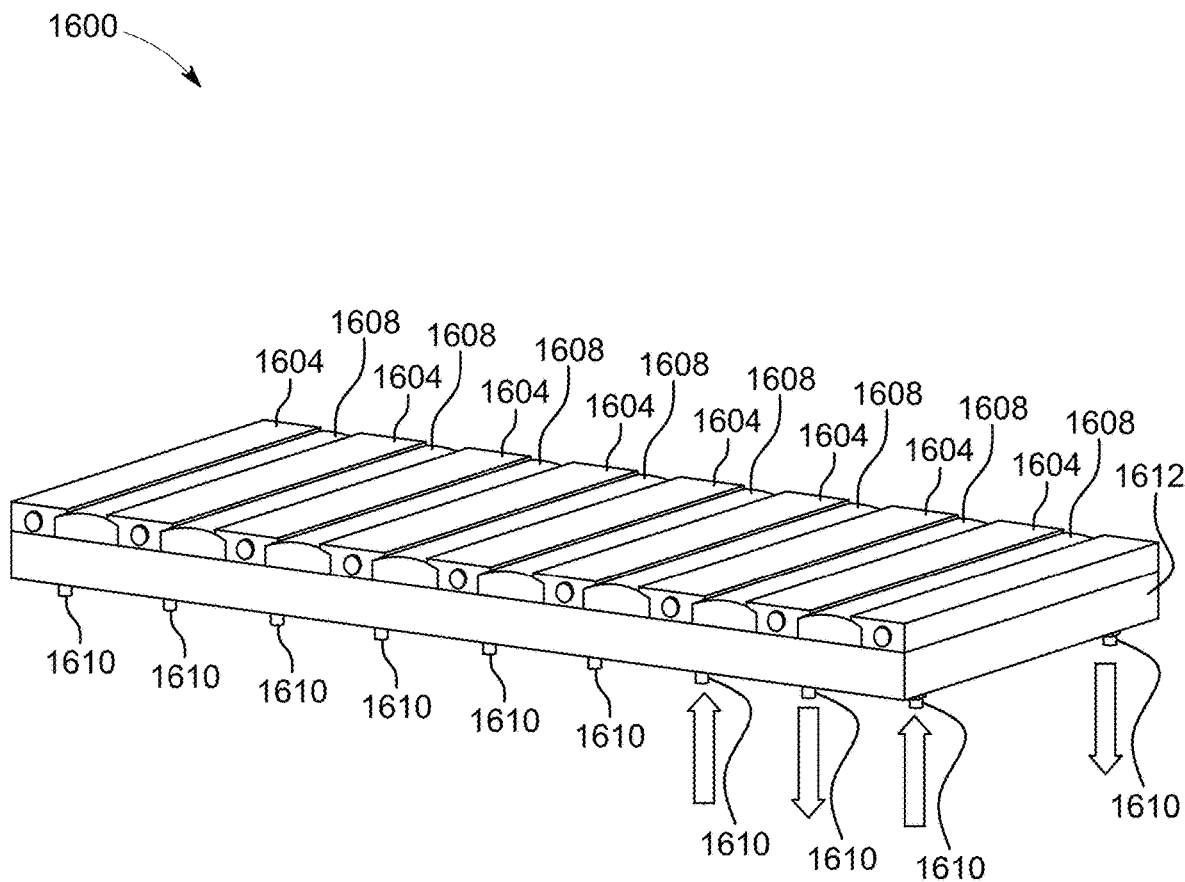
FIG. 16 illustrates a profile view of an exemplary linear motor rotor pole cooling system according to an embodiment of the present disclosure.

FIG. 16 illustrates a profile view of an exemplary linear motor rotor pole cooling system 1600 according to an embodiment of the present disclosure with arrows which indicate a path for coolant to flow. This coolant is typical, but other series-parallel flow configurations are possible. A linear motor is an electric motor that has had its stator and rotor "unrolled." Thus, instead of producing a torque (i.e., rotation), it produces a linear force along its length. The linear motor can include a plurality of magnets 1608 that can be retained by pole retainers 1604. The linear motor rotor pole cooling system 1600 can route cooling fluid through cooling ducts, not shown, that are disposed inside and oriented along the length of the pole retainers 1604. The cooling fluid can be routed through fluid connections 1610 to the cooling ducts inside the pole retainers. The fluid connections 1610 can be connected to one or more hoses or connected to a cooling manifold. The fluid connections 1610 can be threaded. The pole retainers 1604 can be coupled to a magnetic back iron 1612 via fasteners or other common fastening methods (e.g., rivet, weld, tension rod, adhesive, etc.). One skilled in the art will understand that not all pole retention hardware must have coolant through it.

Figure 17:
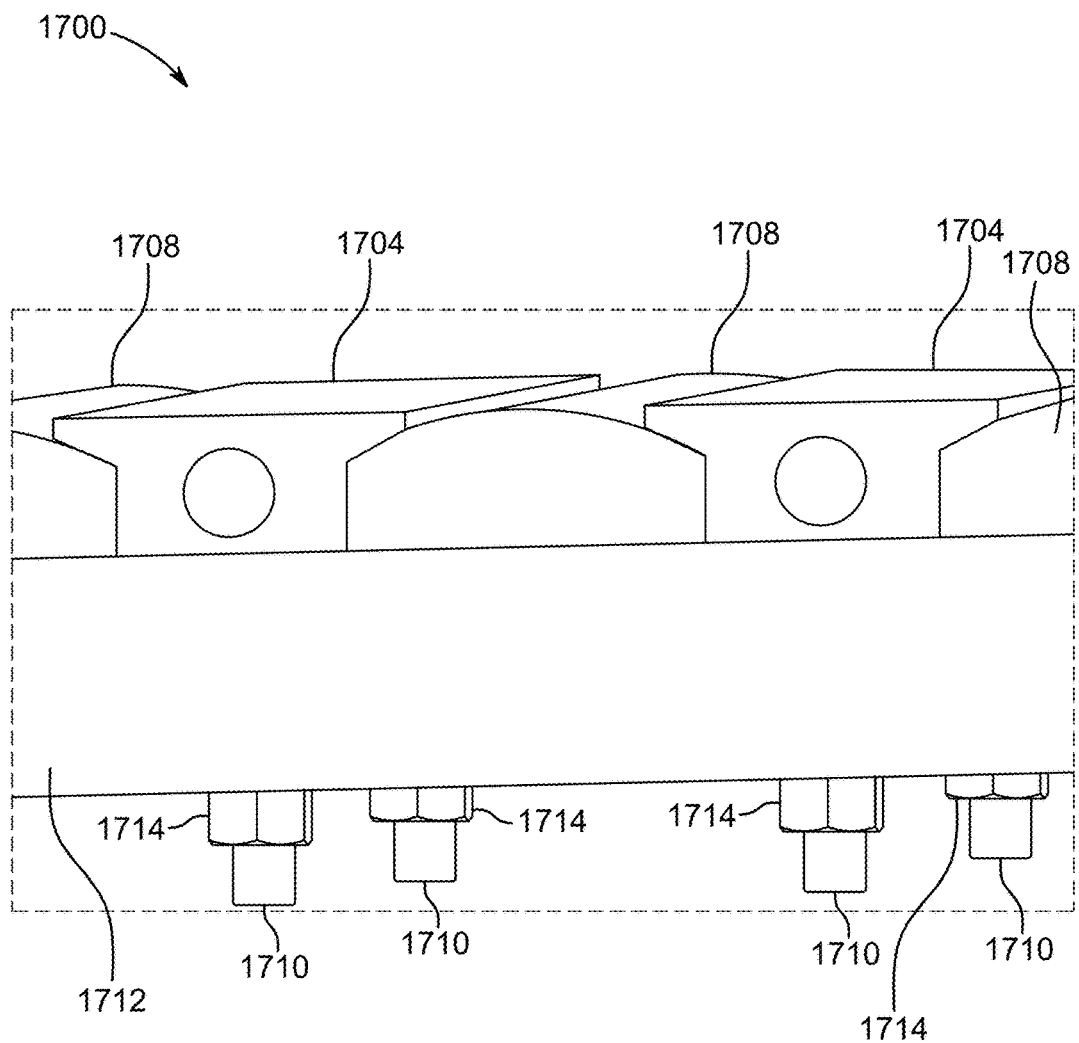
FIG. 17 illustrates a side view of an exemplary linear motor rotor pole cooling system according to an embodiment of the present disclosure.

FIG. 17 illustrates a side view of an exemplary linear motor rotor pole cooling system 1700 according to an embodiment of the present disclosure. FIG. 17 illustrates a portion of a linear motor that includes a plurality of pole retainers 1704 to retain magnets 1708 to a magnetic back iron 1712. Fluid connections 1710 route cooling fluid through cooling ducts formed inside the pole retainers 1704. The fluid connections 1710 can be threaded and can receive fasteners 1714 to retain the pole retainers 1704 to the magnetic back iron 1712.

Figure 18:
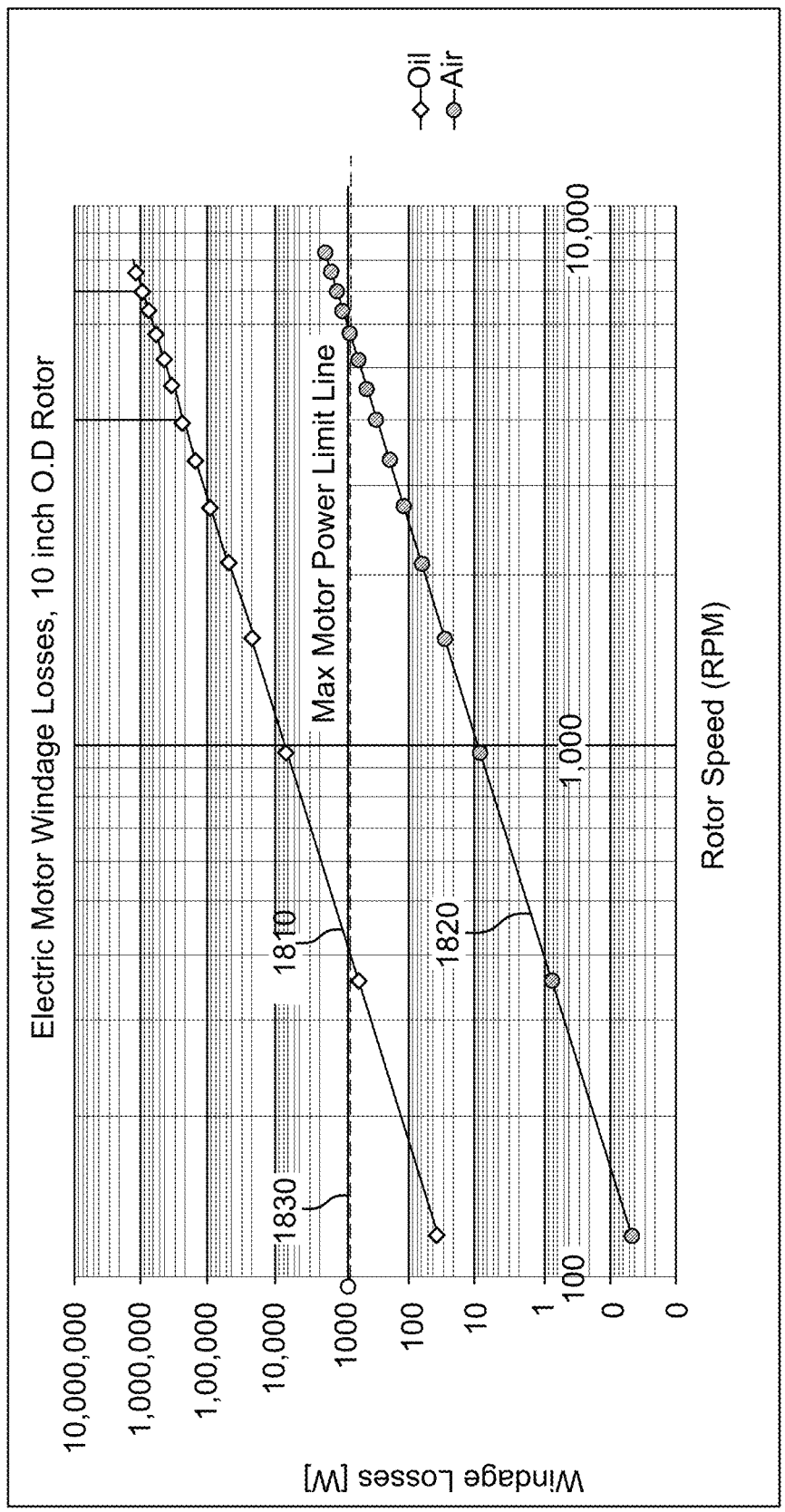
FIG. 18 illustrates a graph of windage losses versus rotor speed for exemplary motor with air in the air gap and oil in the air gap according to an embodiment of the present disclosure.

FIG. 18 illustrates a graph of windage losses versus rotor speed for exemplary motor with air in the air gap and oil in the air gap. In the embodiment of the present disclosure, oil-filed air gaps for cooling can be replaced by air with the present disclosure pole retainer cooling method, enabling lower losses and higher rotor speed for the same electromagnetic motor design. A TORUS style Axial Flux electric machine can feature air cooling or direct oil cooling (submerged in oil or spray-cooled in oil) of windings when higher power density is required. This can be required to remove losses generated during motoring or generating (e.g., $I^2R$ copper losses or hysteresis and eddy current losses in iron core and/or magnets). The stator pole retainer with integral cooling provided by embodiments of the present disclosure enables TORUS Axial Flux style motors to achieve higher speeds and efficiencies for applications in which high power density is required. This benefit can be achieved through the reduction of windage losses, caused by submerging the rotating motor components in oil or from spraying or dripping coolant onto the rotating components. In an axial flux motor, windage losses can be a direct result of the fluid density and dynamic viscosity, as provided by the equations below:

$$Pw = 0.5 C_f \rho (2\pi n)^3 (R_{out}^5 - R_{sh}^5)$$

Where $C_f$=coefficient of drag
$\rho$=Density of cooling material (kg/m$^2$)
$R_{out}$=Outer Rotor Diameter (m)
$R_{in}$=Shaft Diameter (m)
$C_f = 3.87/R_e^{0.55}$
$Re = 2\pi n \rho R_{out}^2 / \mu$
Where $\mu$=Dynamic Viscosity of Working Fluid (Pa S)

For a fixed rotor size (e.g., 10 inch outside diameter, 2 inch shaft diameter) an electric machine will only be able to produce a fixed amount of power (e.g., 1,000 watts), limited by the cooling system's ability to remove heat and the electromagnetic design. If this fixed amount of power is exceeded by windage losses, the machine will no longer be able to operate at that speed and deliver power. This can typically be observed during acceleration, during which the motor will stop accelerating once it reaches the maximum power available. For example, FIG. 18 illustrates a plot of windage losses in watts vs. rotor speed in rotations per minute. The first line 1810 represents an oil-cooled motor and the second line 1820 represents an air-cooled motor. The maximum power line limit 1830 represents the maximum power that can be produced and is limited by the cooling system's ability to remove heat and the electromagnetic design. In FIG. 18, the maximum power limit 1830 is 1,000 watts.

As can be shown in FIG. 18, the oil-cooled motor reaches the maximum power limit at a lower speed (e.g., 440 rpm), while the air-cooled motor only reaches the maximum power limit at 6400 rpm. Therefore, the air-cooled motor can reach higher speeds because the air-cooled motor does not need to overcome the viscous drag of the cooling fluid. Therefore, cooling techniques that do not involve immersing the motor in a cooling fluid can result in a more power-dense motor that can reach higher speeds.

Figure 19:
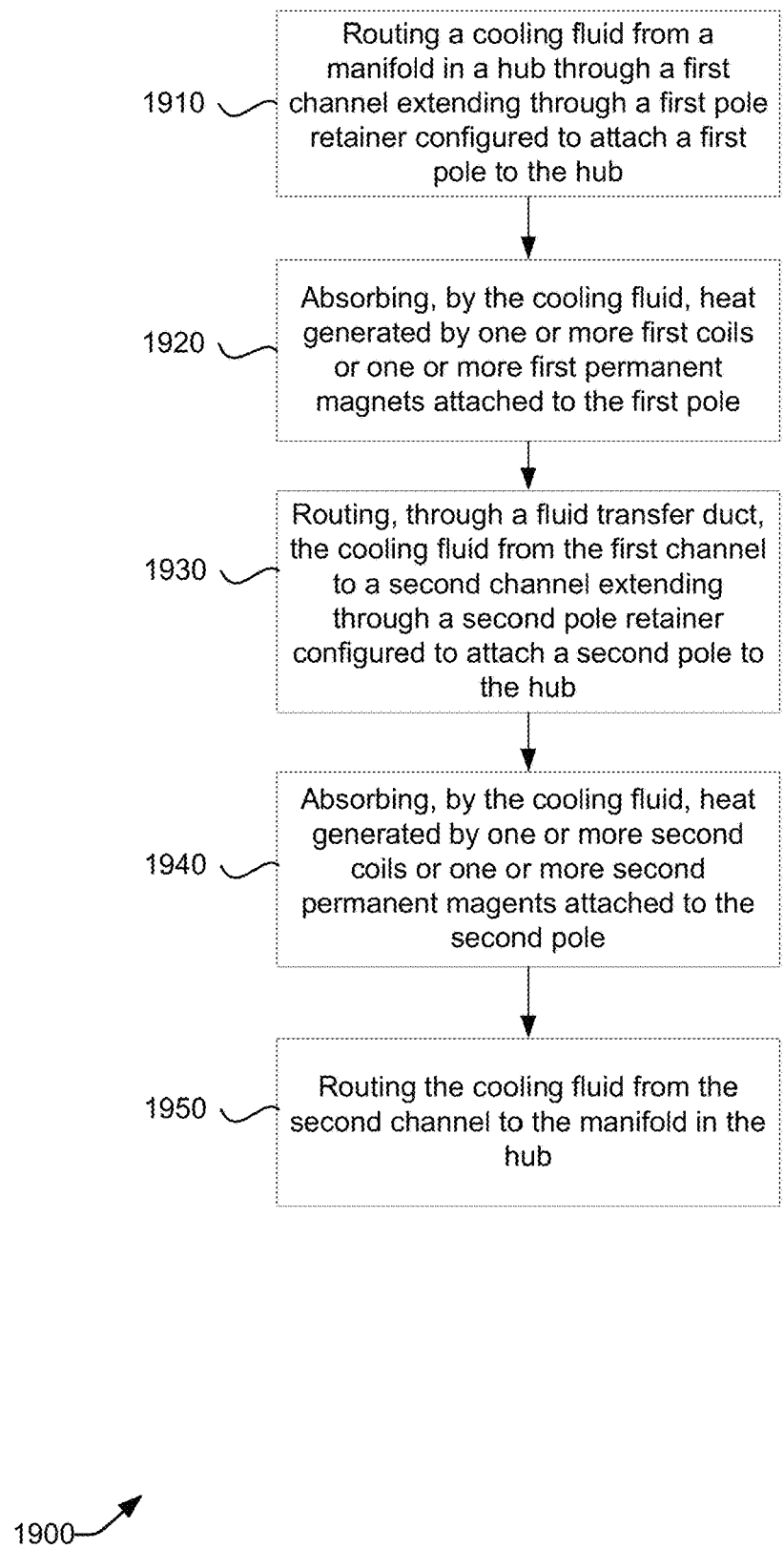
FIG. 19 illustrates an exemplary flowchart illustrating a method of cooling an electric motor according to an embodiment of the present disclosure.

FIG. 19 illustrates an exemplary flowchart illustrating a process 1900 of cooling an electric motor according to an embodiment of the present disclosure. In some implementations, one or more process blocks of FIG. 19 can be performed by an electric machine. In some implementations, one or more process blocks of FIG. 19 can be performed by another device or a group of devices separate from or including the electric machine.

The method can include routing a cooling fluid from a manifold in a hub through a first channel extending through a first pole retainer configured for attaching a first pole to the hub (1910). The techniques can be applied to one or more components (e.g., stators) of TORUS AFPM poles, salient pole retainers for a rotor, an axial field topology rotor, a radial field topology rotor, linear motors, or some combination thereof. A pump can apply pressure to the cooling fluid to route the cooling fluid through the channels passing through one or more pole retainers of the poles of the motor and through the manifold in the hub.

The method can include absorbing, by the cooling fluid, heat generated by one or more first coils attached to the first pole (1920). Heat can be generated by the coils of a motor as alternating current is passed through the coils to create a magnetic field. The heat can be transferred from the one or more first coils or one or more first permanent magnets attached to the pole via conduction. The heat can be further transferred by convection to the surrounding air and the cooling fluid being circulated through the pole.

The method can include a fluid transfer duct, the cooling fluid from the first channel to a second channel extending through a second pole retainer configured to attach a second pole to the hub (1930). The fluid transfer duct can be a manifold. The fluid transfer duct can be a tube or a pipe. The pressure from the pump can cause the fluid to route from the first channel to the second channel through the fluid transfer duct.

A pump can apply pressure to the cooling fluid to route the cooling fluid through the channels through one or more pole retainers of the poles of the motor and through the manifold in the hub. In various embodiments, the second pole retainer can be adjacent the first pole retainer. The second pole can be a stator of a TORUS AFPM pole.

The method can include absorbing, by the cooling fluid, heat generated by one or more second coils attached to the second pole (1940). The heat can be transferred from the one or more second coils or one or more second permanent magnets attached to the pole via conduction. The heat can be further transferred by convection to the surrounding air and the cooling fluid being circulated through the pole.

The method can include routing the cooling fluid from the second channel to the manifold in the hub (1950). The pressure from the pump can cause the cooling fluid to be routed from the second channel to the manifold.

In various embodiments, the method can include routing the cooling fluid through a heat exchanger in the manifold in the hub.

In various embodiments, the method can include routing the cooling fluid through a heat exchanger disposed between the first channel and the second channel.

In various embodiments, the method can include circulating the cooling fluid by rotating the hub.

In various embodiments, the method can include measuring a temperature of the cooling fluid via a temperature sensor in communication with the cooling fluid.

The specific details of particular embodiments may be combined in any suitable manner or varied from those shown and described herein without departing from the spirit and scope of embodiments of the disclosure.

Process 1900 can include additional implementations, such as any single implementation or any combination of implementations described below and/or in connection with one or more other processes described elsewhere herein. It should be appreciated that the specific steps illustrated in FIG. 19 provide particular techniques for cooling an electric motor according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 19 can include multiple sub-steps that can be performed in various sequences as appropriate to the individual step. Although FIG. 19 shows example steps of process 1900, in some implementations, process 1900 can include additional steps, fewer steps, different steps, or differently arranged steps than those depicted in FIG. 19. Additionally, or alternatively, two or more of the steps of process 1900 can be performed in parallel. Furthermore, additional steps can be added or removed depending on the particular applications. One of ordinary skill in the art would recognize many variations, modifications, and alternatives.

The above description of exemplary embodiments of the disclosure has been presented for the purposes of illustration and description. It is not intended to be exhaustive or to limit the disclosure to the precise form described, and many modifications and variations are possible in light of the teaching above. The embodiments were chosen and described in order to best explain the principles of the disclosure and its practical applications to thereby enable others skilled in the art to best utilize the disclosure in various embodiments and with various modifications as are suited to the particular use contemplated.

All publications, patents, and patent applications cited herein are hereby incorporated by reference in their entirety for all purposes.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the disclosure. Also, a number of steps may be undertaken before, during, or after the above elements are considered.

What is claimed is:

1. A pole retainer apparatus comprising:
   a pole retainer for retaining a pole to a hub, wherein the pole retainer comprises a proximal end mounted on the hub and a distal end;
   a channel extending through the pole retainer from the proximal end of the pole retainer to the distal end of the pole retainer;
   a mount located at the distal end of the pole retainer and configured to retain the pole on the hub; and
   a fluid transfer duct connected to the mount.

2. The pole retainer apparatus of claim 1, wherein the fluid transfer duct connects to a condenser comprising one of more fins and a reservoir.

3. The pole retainer apparatus of claim 1, wherein the channel is configured to be connected to a manifold integrated in the hub.

4. The pole retainer apparatus of claim 1, wherein the channel is configured to contain a liquid coolant.

5. The pole retainer apparatus of claim 1, wherein the channel is configured to contain a heat pipe.

6. The pole retainer apparatus of claim 1, wherein the distal end of the pole retainer is threaded.

7. The pole retainer apparatus of claim 1, wherein the fluid transfer duct comprises a tube.

8. The pole retainer apparatus of claim 1, wherein the fluid transfer duct comprises a pipe.

* * * * *